US006898492B2

(12) United States Patent
de Leon et al.

(10) Patent No.: US 6,898,492 B2
(45) Date of Patent: May 24, 2005

(54) SELF-CONTAINED FLIGHT DATA RECORDER WITH WIRELESS DATA RETRIEVAL

(76) Inventors: Hilary Laing de Leon, 2402 One San Miguel Avenue Bldg. San Miguel Ave. Cor. Shaw Blvd., Pasiq City, Metro-Manila (PH); Roland E. Quiros, 631 N. Stephanie St., #555, Henderson, NV (US) 89014

(*) Notice: Subject to any disclaimer, the term of this patent is extended or adjusted under 35 U.S.C. 154(b) by 0 days.

(21) Appl. No.: 09/803,889

(22) Filed: Mar. 13, 2001

(65) Prior Publication Data

US 2002/0035416 A1 Mar. 21, 2002

Related U.S. Application Data

(60) Provisional application No. 60/189,581, filed on Mar. 15, 2000.

(51) Int. Cl.[7] ............................................ G06F 19/00

(52) U.S. Cl. ......................... 701/35; 701/14; 701/120; 701/213; 340/438; 340/439; 244/189; 244/190

(58) Field of Search ............................... 701/3, 13, 14, 701/35, 120, 207, 213; 340/438, 439, 3.5, 3.3, 531, 945, 825.72; 244/189, 190; 342/29, 36, 30, 357.09, 357.13, 357.08; 455/66; 375/130

(56) References Cited

U.S. PATENT DOCUMENTS

| | | | | |
|---|---|---|---|---|
| 4,378,574 A | | 3/1983 | Stephenson | |
| 4,409,670 A | | 10/1983 | Herndon et al. | |
| 4,470,116 A | | 9/1984 | Ratchford | |
| 4,656,585 A | | 4/1987 | Stephenson | |
| 4,729,102 A | * | 3/1988 | Miller et al. | 360/5 |
| 4,970,116 A | | 11/1990 | Kimura et al. | |
| 5,111,400 A | * | 5/1992 | Yoder | 342/29 |
| 5,193,046 A | * | 3/1993 | Lemke et al. | 360/234.1 |
| 5,283,643 A | | 2/1994 | Fujimoto | |
| 5,317,463 A | * | 5/1994 | Lemke et al. | 360/97.02 |
| 5,438,162 A | * | 8/1995 | Thompson et al. | 174/52.2 |
| 5,477,917 A | * | 12/1995 | Salyer | 165/104.26 |
| 5,508,922 A | * | 4/1996 | Clavelloux et al. | 169/48 |
| 5,890,079 A | | 3/1999 | Levine | |
| 6,005,513 A | * | 12/1999 | Hardesty | 342/357.09 |
| 6,092,008 A | * | 7/2000 | Bateman | 244/158 R |
| 6,148,179 A | | 11/2000 | Wright et al. | |
| 6,173,159 B1 | | 1/2001 | Wright et al. | |
| 6,278,396 B1 | * | 8/2001 | Tran | 342/29 |
| 6,278,913 B1 | * | 8/2001 | Jiang | 244/158 R |
| 2002/0018008 A1 | * | 2/2002 | Wright et al. | 340/945 |

* cited by examiner

*Primary Examiner*—Thomas G. Black
*Assistant Examiner*—Ronnie Mancho
(74) *Attorney, Agent, or Firm*—Quirk & Tratos; Rob L. Phillips

(57) ABSTRACT

A flight recorder designed for small aircraft captures various onboard flight data in real-time and stores it in non-volatile memory. Recorded data includes aircraft's instantaneous position, altitude, attitude, engine RPM, G forces, flap position, cockpit voice and others. These data are obtained from various sensors which are integrated into the recorder. At the end of a flight the recorded data is downloaded into a computer using a wireless communications data transceiver also integrated into the recorder. It does not require removal or attaching any equipment to be able to download data. In addition to accident investigation, applications include training, preventive maintenance and asset monitoring.

4 Claims, 21 Drawing Sheets

SELF-CONTAINED FLIGHT DATA RECORDER WITH WIRELESS DATA RETRIEVAL

CROSS REFERENCE TO RELATED APPLICATIONS

This application claims the benefit of Provisional Patent Application No. 60/189,581, filed Mar. 15, 2000.

BACKGROUND

1. Field of the Invention

This invention relates to aviation, specifically to flight data recording systems as applied to light aircraft.

2. Description of Prior Art

Most flight data recorders are designed for use in accident investigation in large aircraft such as wide-body airline jets. These are highly expensive systems that consist of several heavy and bulky pieces of equipment and a multitude of sensors and cables deployed throughout the aircraft, making it impractical for use in light aircraft. Recorded data is retrieved by attaching a portable device to the recorder or by physically removing the recorder and bringing it to a retrieval facility. They are designed to withstand very high temperatures for prolonged periods, great impact forces and deep submersion in water. These are the usual environmental conditions present during a violent crash of large aircraft, especially jets. In light aircraft crashes, especially for propeller-driven types, the magnitude of the impact forces are much less and the probability of prolonged and high-intensity fires is less.

State-of-the-art flight data recorders consist of solid state circuits, including the main data storage where data are all recorded in digital format. They normally conform certain international standards such as FAA's TSO C124a, EUROCAE ED-55 and RTCA/DO-178B.

U.S. Pat. No. 6,148,179 issued to Wright, et al. discloses a flight and engine event recording system with a wireless spread spectrum link to a ground station. This is an event-driven system that records only significant changes in flight data and is primarily used for better control of jet engines during take-offs and landings.

U.S. Pat. No. 4,409,670 to Herndon, et al. describes a solid state digital flight data recorder that stores data using a first-in-first-out method and two levels of non-volatile memories. The scope of this invention scope is limited to data storage functions.

U.S. Pat. No. 6,173,159 to Wright et al. is a system for updating flight management files using a wireless spread spectrum data link to ground. It is primarily designed to be used by airlines to update their navigation database files every 28 days using a wireless communications link. Various related patents to the same party deal mostly with different features of a wireless data communications system between aircraft and ground.

U.S. Pat. No. 6,092,008 to Bateman discloses a flight event recording system that records data when it exceeds certain thresholds and allows wireless retrieval of data in real-time. It is designed primarily for accident applications and uses cellular phone technology for wireless communications. The system consists of several modules and sensors distributed throughout the aircraft.

U.S. Pat. No. 5,890,079 to Levine discloses a remote flight monitoring and advisory system that continuously transmits flight data, video and audio to a ground-based monitoring station while the aircraft is in flight. This is more of an on-line monitoring system than a flight data recorder. It requires an expensive communications infrastructure that should guarantee global coverage and this may be difficult to realize.

U.S. Pat. No. 5,283,643 to Fujimoto describes a flight information recording device for small aircraft that utilizes a video camera, mirrors and opal sensors to capture the movement of the wings and control surfaces and record these in a video tape recorder. It also records the pilot's heartbeat and cockpit audio signals. The invention is difficult to install since it requires a multitude of devices and equipment to be deployed throughout the aircraft, many of them mechanical in nature. It also does not have a provision for a wireless data retrieval system.

U.S. Pat. No. 4,729,102 to Miller, Jr. et al., U.S. Pat. No. 4,656,585 to Stephenson and U.S. Pat. No. 4,470,116 to Ratchford are aircraft data acquisition and recording systems that use various pieces of equipment distributed throughout the aircraft and no capability for wireless data retrieval.

U.S. Pat. No. 4,409,670 to Herndon deals with a serial FIFO memory structure for storing flight data while U.S. Pat. No. 4,378,574 to Stephenson is a digital-tape based storage system. Both patents are confined to storage systems only.

The "high performance flight recorder" covered by U.S. Pat. No. 4,970,648 issued to Capots is a digital recording system with no wireless data retrieval capability and does not incorporate sensing functions.

OBJECTS AND ADVANTAGES

The objects and advantages of this invention are as follows:

1. To provide an inexpensive flight data recorder that is suited for light single and multi-engine aircraft, including ultra-light aircraft.
2. To provide a flight data recorder that is simple and inexpensive to install, that even non-specialists can install it in a matter of one hour or less.
3. To provide a flight data recorder that has built-in sensors, thereby simplifying installation and enhancing system reliability due to the absence of numerous electronic devices and cables scattered all around the aircraft.
4. To provide a flight data recorder whereby the stored data is very easy to retrieve.
5. To provide a flight data recorder whereby the stored data can be retrieved without the need for detaching the recorder from the aircraft, removing an accessory such as a storage module or attaching a retrieval device to it.
6. To provide a flight data recorder whereby the stored data can be retrieved from a certain distance from the aircraft while on the ground or underwater.
7. To provide a flight data recorder that can also record voice signals inside the cockpit.
8. To provide a flight data recorder that includes software that shall allow wireless retrieval, graphical display and analysis of recorded data using a personal computer.
9. To provide a flight data recorder that can continuously operate for a few hours even if the aircrafts electrical supply fails.
10. To provide a flight data recorder that has other applications besides accident investigation. Examples of these applications are: training, analysis of flight operations, check rides, preventive maintenance and asset monitoring.

BRIEF DESCRIPTION OF DRAWINGS

FIG. 9 is the block diagram of the different accessories of the flight data recorder.

Drawing Reference Numerals Worksheet

Figure 1A:
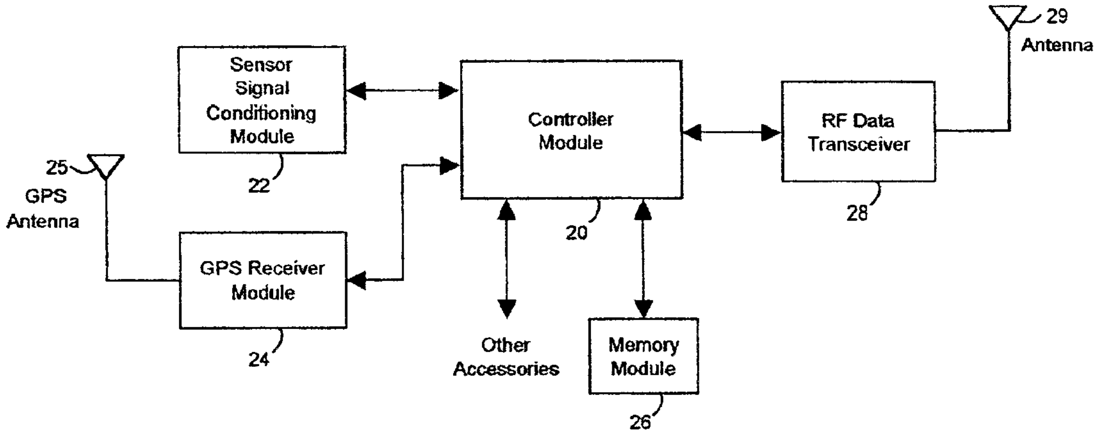
FIGS. 1A and 1B show the block diagrams of the flight data recorder unit and the data retrieval unit.

| | PART NAME |
|---|---|
| 20 | Controller Module |
| 22 | Sensor and Signal Conditioning Module |
| 24 | GPS Receiver Module |
| 25 | GPS Antenna |
| 26 | External Memory Module |
| 28 | RF Data Transceiver Module |
| 29 | Antenna of RF Data Transceiver of Flight Data Recorder |
| 30 | RF Data Transceiver Module of Retrieval Unit |
| 31 | Antenna of RF Data Transceiver of Retrieval Unit |
| 32 | Host PC with Application Software |
| 38 | Microcontroller |
| 40 | Digital Multiplexer |
| 42 | RS232 Level Converter |
| 44 | EPROM |
| 46 | Address Bus |
| 47 | Control Lines |
| 48 | Data Bus |

-continued

Drawing Reference Numerals Worksheet

| | PART NAME |
|---|---|
| 49 | Chip Select Lines |
| 50 | Address Decoder |
| 52 | Real-Time Clock |
| 54 | Back-Up Lithium Battery |
| 56 | Flash Memory |
| 62 | Voltage Regulator |
| 64 | Back-Up Battery (Optional) |
| 66 | Charger |
| 68 | Voltage Regulator |
| 70 | Blocking Diode |
| 72 | Blocking Diode |
| 74 | Electronic Switch |
| 80 | Input Over Voltage Protection |
| 82 | Frequency to Voltage Converter |
| 84 | Output Clipper |
| 86 | Accelerometer |
| 88 | Offset and Scale Factor Adjustment |
| 90 | Filter |
| 92 | Air Temperature Sensor |
| 94 | Differential Amplifier |
| 96 | Input Over Voltage Protection |
| 98 | Level Converter and Buffer |
| 100 | Adjustable Voltage Reference Circuit |
| 102 | Sensor |
| 104 | Buffer |
| 108 | Air Pressure Sensor |
| 110 | Noise De-coupling Filter |
| 112 | Accelerometer |
| 114 | Buffer |
| 116 | Low-pass Filter |
| 118 | Piezoelectric Gyroscope |
| 122 | Amplifier |
| 124 | Low-pass Filter |
| 140 | RF Section |
| 141 | RF Filter |
| 142 | Signal Processor |
| 143 | Phase Locked Loop Filter |
| 144 | CPU |
| 145 | IF Filter |
| 146 | EPROM |
| 147 | Reference Crystal |
| 148 | SRAM |
| 149 | RF Front End |
| 152 | RS232 Interface |
| 160 | Antenna Matching Network |
| 162 | Phase Locked Loop Filter |
| 164 | Transceiver |
| 166 | Vco Modulation/Crystal |
| 168 | Microcontroller |
| 169 | Control Interface |
| 172 | Stainless Steel Housing |
| 174 | Thermal Insulation |
| 176 | PCB Shock Mounts |
| 178 | Waterproof Connector |
| 180 | Waterproofing Seal |
| 182 | Stainless Steel Backplate |
| 184 | Mounting Bracket |
| 186 | Module Frame |
| 188 | Mounting Flange |
| 190 | Stainless Steel Backplate |
| 192 | Aluminum Alloy Case |
| 194 | Fireproof Encapsulation |
| 196 | Waterproof Sealant |
| 198 | Printed Circuit Board |
| 200 | Memory Chip |
| 202 | Wires |
| 210 | Flap Position Indicator |
| 212 | Flap Motor |
| 214 | Aircraft's Ignition Switch |
| 216 | Aircraft's Power Bus |
| 218 | Circuit Breaker |
| 220 | Aircraft's Electrical Ground |
| 222 | Air Outlet |
| 224 | Waterproof Connector |
| 228 | Wire |

-continued

Drawing Reference Numerals Worksheet

| | PART NAME |
|---|---|
| 230 | Wire |
| 232 | Wire |
| 234 | Wire |
| 236 | Flap Position Transmitter |
| 238 | Wires |
| 240 | Voice Chip |
| 242 | Analog-to-Digital Converter |
| 248 | Microphone |
| 248 | Microcontroller |
| 250 | Microcontroller |
| 252 | Ultrasonic Transducer |
| 254 | Excitation Circuit |
| 256 | Receiver Circuit |
| 258 | Liquid Crystal Display |
| 260 | Microcontroller |
| 280 | Initialization Module |
| 282 | Time to Record? |
| 284 | Data Acquisition Module |
| 286 | New Group Created? |
| 288 | Create New Group |
| 290 | Data Encoding Module |
| 292 | Data Recording Module |
| 294 | Decipher Command |
| 296 | Command Valid? |
| 298 | Command Execution Module |
| 300 | Increment Serial Time Out Counters |
| 302 | Serial Ctr Timed Out? |
| 304 | Set Serial Time Out Flag |
| 306 | Increment Recording Interval Counters |
| 308 | Recording Interval Ctr Timed Out? |
| 310 | Set 'OK to Record' Flag |
| 312 | Initialize UART, RTC, Timers and Counters |
| 314 | Compare SRAM Data to Flash Data |
| 316 | Data Valid? |
| 318 | Update Latest Group |
| 320 | Retrieve Lost SRAM Data |
| 322 | Reconfigure RTC |
| 326 | Detect GPS Module |
| 328 | Module Detected? |
| 330 | Identify GPS Format |
| 332 | NMEA Detected? |
| 334 | Set to NMEA Format |
| 336 | Previously set to Mfr |
| 338 | Set to Mft Format |
| 340 | Wait for GPS Data |
| 342 | GPS Data Detected? |
| 344 | Serial Port Timed Out? |
| 346 | Select Sensor Analog Input 1 |
| 348 | Perform ADC on Selected Input |
| 350 | Save Sensor Data on Buffer |
| 352 | All Inputs Read? |
| 354 | Select Next Input |
| 358 | Calculate GPS Data Delta |
| 360 | Overflow Detected? |
| 362 | Change of Date Detected? |
| 364 | Create New Group |
| 366 | Convert Delta to BCD |
| 368 | Encode GPS Data with Sensor Data |
| 370 | Write Record to Flash |
| 372 | Read Record from Flash |
| 374 | Written and Read Data the Same? |
| 376 | Flash Error Detected N times? |
| 378 | Recording Interval Calculation Module |
| 380 | Report Flash Error |
| 382 | Increment Write Address Pointer |
| 384 | GPS Data Valid? |
| 386 | Calculate Speed |
| 388 | Speed $<V_1$ |
| 390 | Interval = $t_3$ |
| 392 | Speed $<V_2$ |
| 394 | Interval = $t_1$ |
| 395 | Interval = $t_2$ |
| 396 | Search for Group |
| 398 | Group Found? |
| 400 | Date Matched? |

-continued

Drawing Reference Numerals Worksheet

| | PART NAME |
|---|---|
| 404 | Transmit Grp Header |
| 406 | Reply Found? |
| 408 | Transmit 'Dump Time Out' |
| 409 | Transmit 'Dump End' |
| 410 | Command: Continue |
| 412 | Command: Abort |
| 414 | Command: Skip Group |
| 416 | Command: Resend |
| 418 | Transmit 'OK' |
| 420 | Search for Record |
| 422 | Record Found? |
| 424 | Transmit 'Group End' |
| 426 | Transmit 'Record' |
| 428 | Reply Found? |
| 430 | Transmit 'Dump Time Out' |
| 432 | Command: Abort |
| 434 | Command: Skip Group |
| 436 | Command: Continue |
| 438 | Command: Resend |
| 440 | Transmit 'OK' |
| 500 | File |
| 502 | Data File Read/Write |
| 504 | Download Data/Change Unit ID |
| 506 | Flight File Open/Close/Save |
| 508 | Print, Print Setup and Preview |
| 510 | Any Recent Files? |
| 512 | Open Recent File |
| 514 | Edit |
| 516 | Any Open Data File? |
| 518 | Clear All |
| 520 | Landmark/s Present? |
| 522 | Delete Landmark/s |
| 524 | Insert |
| 526 | Any Open Data File? |
| 528 | Insert Grid/Text/Graphics File/Landmarks |
| 530 | View |
| 532 | Any Open Data File? |
| 534 | View Toolbar/Status Bar |
| 536 | Flight Monitor, Measurements, Unit Time/Date |
| 538 | Zoom In/Out |
| 540 | Plot |
| 542 | Any Open Data File? |
| 544 | X-Y/X-Z/Y-Z View |
| 546 | Flight Segment |
| 548 | Settings |
| 550 | Grid/Airport Location |
| 552 | Trace Flight Path |
| 554 | Time & Date Setting |
| 556 | Sensor Settings |
| 558 | Window |
| 560 | Any Open Window/s? |
| 562 | Open New Window |
| 564 | Cascade/Tile Windows |
| 566 | Arrange Icons |
| 568 | Help |
| 570 | About FDR Software |
| 572 | ASCII Filename, Time and Date |
| 574 | Initialize File Pointers and Serial Port |
| 576 | Assemble Command Frame |
| 578 | Transmit to Serial Port |
| 580 | Wait for Response |
| 582 | Response Present in Port? |
| 584 | Get Data form Port, Put in Binary File |
| 586 | Last Data to Retrieve? |
| 588 | Process Binary File, Put Processed Data in ASCII File |
| 590 | Save and Close ASCII File |
| 592 | Timeout Reached? |
| 594 | Issue a Data Error Message |
| 596 | Open Binary File and New ASCII File |
| 598 | Get New Group |
| 600 | Get 13-Byte Reference Data |
| 602 | Extract Coordinates and Time |
| 604 | Write Data in ASCII File |

-continued

| Drawing Reference Numerals Worksheet | |
|---|---|
| | PART NAME |
| 606 | Get 16-Byte Delta Data |
| 608 | Extract Time and Coordinate Deltas and Sensor Readings |
| 610 | New Reference = Reference Delta |
| 612 | Compute Sensor Data |
| 614 | Write Data in ASCII File |
| 616 | Last Delta? |
| 618 | Last Group? |
| 620 | Save and Close ASCII File |
| 622 | Open ASCII File |
| 624 | Check for File Validity |
| 626 | Get Sensor Data |
| 628 | Extract and Filter GPS Data |
| 630 | Store Data Point in User-Defined Data Structure |
| 632 | Last Data Point? |
| 634 | Compute for X, Y, ZND Z Coordinates for each Data Point |
| 636 | Convert Each Set of Coordinates Into Screen Coordinates |
| 638 | Plot X-Y View of Flight Path |
| 640 | Compute and Display Total Time and Distance Traveled |
| 642 | Initialize Slider Range |
| 644 | Initialize Line and Page Size |
| 646 | Wait for User to Scroll Slider |
| 648 | Index = Slider Position |
| 650 | Retrieve GPS Data from Array [index] |
| 652 | Mark Data Point in Flight Path |
| 654 | Display Coordinates and Sensor Data on Flight Monitor Form |

SUMMARY

A flight data recording system is disclosed which records various flight data on-board an aircraft using an apparatus installed on the aircraft comprising a means for measuring and detecting the condition of the aircraft and its surroundings, a means for monitoring the operation of the aircraft's power plant, a means for monitoring the activity of the crew and a means for generating the position information of the aircraft. Said data are stored in non-volatile memory and a wireless means is provided for retrieving said data into a computer located on the ground.

DESCRIPTION OF PREFERRED EMBODIMENT

Figure 1B:
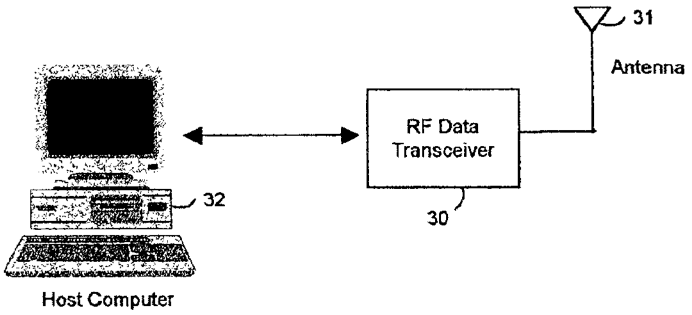

The main components of the flight data recorder are shown in the block diagrams of FIGS. 1A and 1B. The onboard flight data recorder unit is shown in FIG. 1A. A controller module 20 performs the functions of processing the analog signals from a sensor and signal conditioning module 22 which are converted to digital form and then stored by the controller module 20 in its non-volatile memory. A GPS (Global Positioning System) receiver module 24 generates location and information and controller module 20 stores it in its non-volatile memory. In addition, the captured data are also stored in an external memory module, which serves as a back-up. The recorded data are retrieved from memory through the use of a radio frequency data transceiver module 28 together with an antenna 29, providing two-way communications capability to a retrieving device.

GPS receiver module 24 receives signals from several orbiting navigation satellites called Navstar, using an antenna 25. It uses the received data from the satellites to compute its position in the form of latitude and longitude coordinates. These data are generated by receiver module 24 using industry standard formats such as NMEA 0183 and sends it to the controller module 20 which records the data in its memory together with the other data from the sensor and signal conditioning module 22.

All the elements shown in the flight data recorder block diagram of FIG. 1A are contained in a single enclosure.

FIG. 1B shows the data retrieval unit consisting of a host computer 32 and a radio frequency data transceiver 30 together with an antenna 31 which communicates with the transceiver 28 of the flight data recorder. An application software on host computer 32 allows the transfer of flight data from the flight data recorder. It also provides the ability to graphically display the flight path and sensor data and also the ability to compute various flight parameters such as distance between two points, angle of descent, average speed and others.

Figure 2:
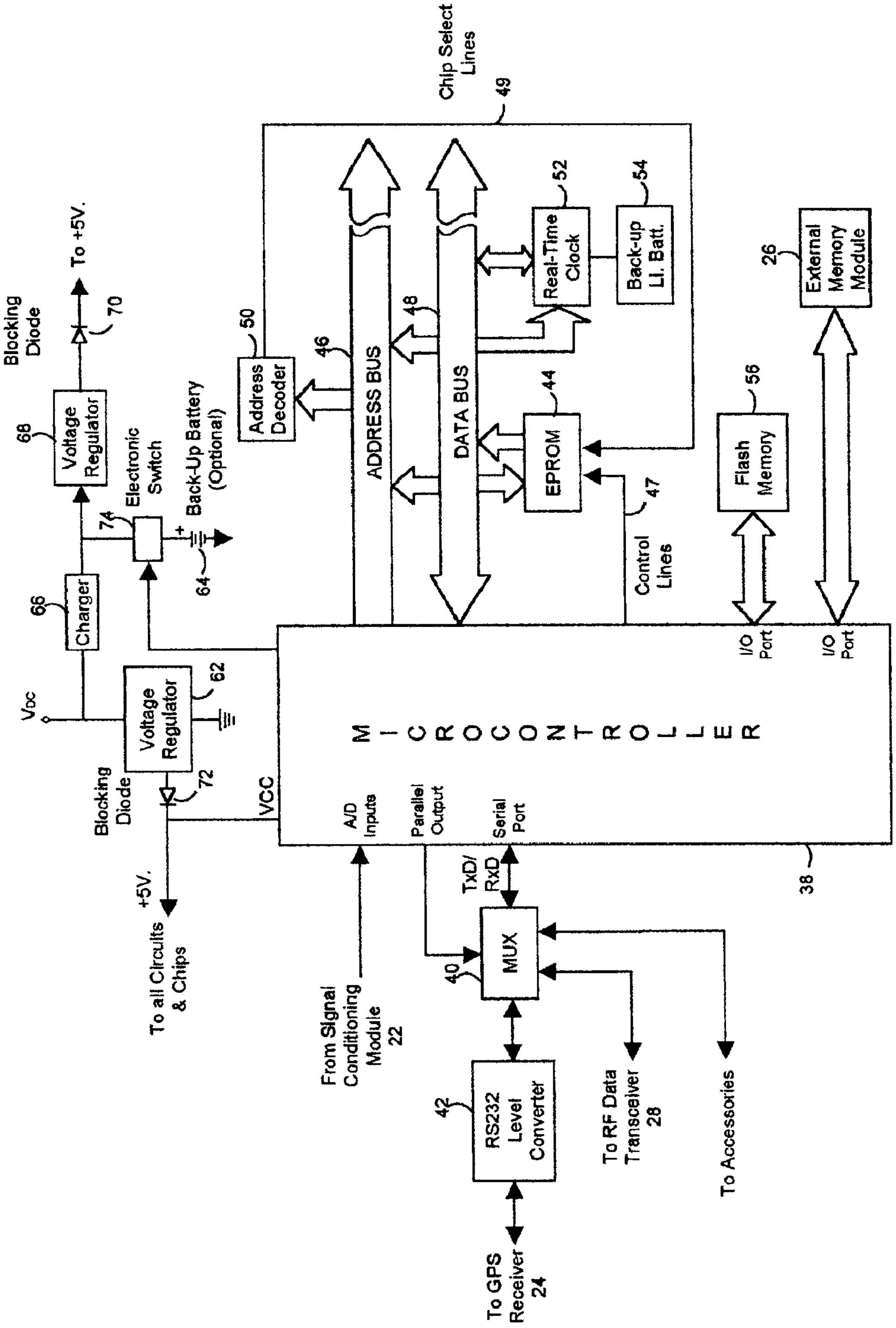
FIG. 2 is the block diagram of the controller module of the flight data recorder.

Referring to FIG. 2, a microcontroller 38 serves as the central processing unit of the data recorder. It is an 8 or 16-bit integrated circuit with built-in memory, analog-to-digital converter, parallel ports and serial ports, similar to the family of 8051 microcontrollers from Philips of Netherlands and the 68HC11 or 68HC16 microcontrollers from Motorola Semiconductor of Phoenix, Ariz. The analog signals from the signal conditioning module 22 of FIG. 1 are interfaced to the inputs of the analog-to-digital converter built into the microcontroller 38. GPS receiver 24 and RF transceiver 28 of FIG. 1 and other optional accessories are interfaced to the microcontroller 38 through a serial port. This is accomplished by using a digital multiplexer 40 which is a device that has one input and several outputs. The signals from the input of the multiplexer can be routed to any of the outputs by setting its select control lines with the binary identification number of the desired output line. In the case of FIG. 2, the select lines are connected to some of the microcontroller's parallel output lines.

One of the outputs of multiplexer 40 is connected to a RS232 level converter 42 which converts TTL (Transistor-Transistor-Logic) signals, which are typically 0–5 volts, to RS232 levels which are ±12 volts. The output of the converter is connected to the GPS receiver module 24 of FIG. 1.

Another output of multiplexer 40 is connected to the RF data transceiver module 28 of FIG. 1. The remaining serial outputs are connected to optional accessories, which are: an underwater transceiver for retrieving data under water, a cockpit voice recorder and a cockpit Liquid Crystal Display (LCD) module for real-time display of flight data for use by the aircraft crew.

An EPROM (Erasable Programmable Read Only Memory) 44 stores the program that microcontroller 38 executes to perform the functions of the flight data recorder. It is interfaced to microcontroller 38 through an address bus 46, data bus 48, control lines 47 and chip select lines 49. The chip select lines are generated by an address decoder 50 which is a device that has several inputs connected to certain lines of the address bus 46 and several outputs which are active only one at a time. Certain combinations of address inputs can cause one of the outputs to be active and this is used to select a device or a chip, one of which is EPROM 44. When a chip is selected it is the only device that can access the data bus 48 and address bus 46.

Another output of the address decoder 50 is used to enable a real-time clock chip 52 which is a very low power device that continuously generates time and date information. It is accessed by the microcontroller 38 through the data bus 48 and address bus 46. In case of the absence of power supply to the flight data recorder, a back-up battery 54 provides power to the real-time clock chip. This assures uninterrupted operation of the real-time clock 52. A commonly used battery for this type of application is the Lithium battery which has the appropriate power density needed for 2 to 3 years of operation.

The position data derived from the GPS receiver module 24 and the sensor data from the signal conditioning module are stored in a non-volatile flash memory 56. Flash memories are electrically erasable and programmable read-only-memories which can be written to erased electrically and can indefinitely retain its contents even in the absence of power. It's interface to the microcontroller 38 can either be through a serial or parallel port. A typical storage capacity is 1 megabyte for one chip.

Memory module 26 of FIG. 1 is a second flash memory device located outside the controller module 20 of FIG. 1 and is interfaced in the same manner as memory 56. It serves as a back-up to memory 56 and is contained in a waterproof and fireproof enclosure which is illustrated later in FIG. 7. In case the controller module or the other parts of the flight data recorder is damaged by fire, impact or water during a crash, the recorded data is still available from memory module 26. Although the main enclosure of the flight data recorder is also waterproof and fireproof, there is still the possibility that the internal parts can be damaged, especially during an unusually violent crash. The enclosure of memory module 26 provides a second level of protection with a better chance of survival because it is protecting a smaller and lighter object which is basically an integrated circuit mounted on a printed circuit board.

Power for the flight data recorder is derived from the aircraft's DC electrical supply which is in the range of 12 to 24 volts DC. This is regulated by a voltage regulator 62 which generates a fixed and stable 5 volts DC supply even if the aircraft supply voltage fluctuates. The output of the voltage regulator 62 provides power to the controller module 20, GPS receiver module 24, certain circuits of sensor and signal conditioning module 22, back-up memory module 26 and RF data transceiver module 28 all of FIG. 1.

During a power failure in flight, it is possible for the flight data recorder to continue operating through the use of an optional back-up battery 64. During normal operation, when power is available from the aircrafts electrical system, the battery is charged using charger 66. The battery used is a rechargeable type such as nickel cadmium, nickel metal hydride or sealed voltage regulators 68 and 62 from loading each other. An electronic switch 74 is provided to switch off the battery supply when the aircraft is not operating to prevent the battery from being discharged unnecessarily. When there are no changes in the sensor readings and the GPS receiver output for a certain period of time, microcontroller 38 interprets this condition as the aircraft being parked or non-operating. The microcontroller then signals the electronic switch to turn off the battery using one of its parallel output lines.

Figure 3:
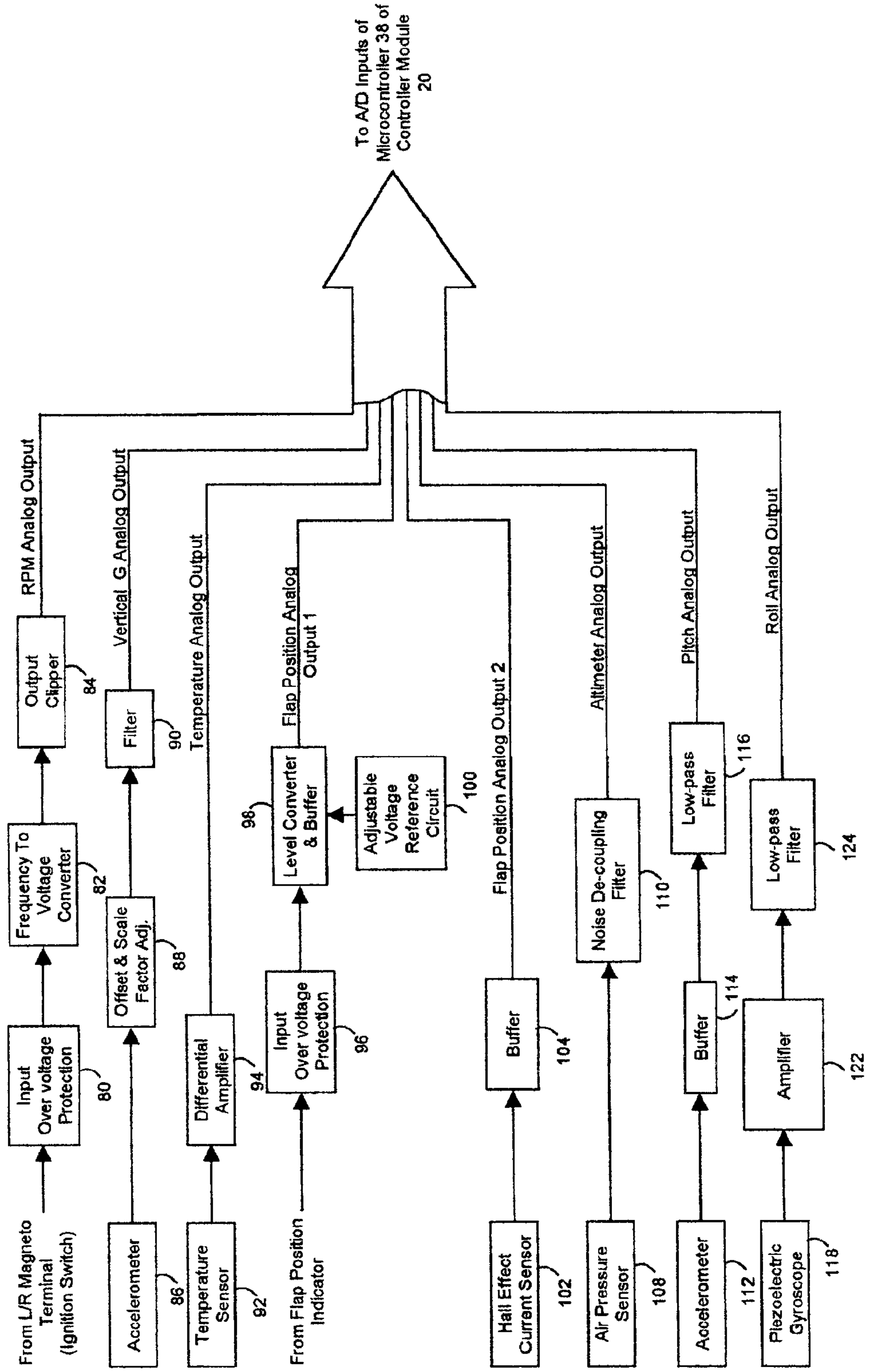
FIG. 3 is the block diagram of the sensor and signal conditioning module of the flight data recorder.

FIG. 3 is a block diagram of the sensor and signal conditioning module. The aircraft engine's rotational speed in revolutions per minute or RPM is measured by determining the frequency of the pulses across the magneto breaker contacts. As the engine shaft rotates, the breaker contacts open and close, the frequency of which is proportional to the engine RPM. The aircraft magneto switch terminals are also connected to the breaker contacts so by attaching wires to these terminals, a circuit can be used to measure the pulse frequency. The wires lead to an input protection circuit 80 that clamps high voltage transients that can be induced by switching loads in the aircrafts electrical system or by natural phenomena such as lightning. In effect, circuit 80 protects the rest of the module from being damaged by the mentioned transients. A frequency-to-voltage converter 82 converts the pulses to a DC signal whose voltage is directly proportional to the pulse frequency. Converter 82 is basically a charge pump with an integrating capacitor, similar to the LM2907 from National Semiconductor of Sta. Clara, Calif. An output dipper 84 prevents the DC signal from exceeding the maximum allowable voltage of 5 volts. The resulting analog signal represents engine RPM and is connected to one of the analog inputs of microcontroller 38 of FIG. 2.

An accelerometer 86 is used to measure the vertical G forces (1 G is equal to 32 ft/sec.$^2$) experienced by the aircraft. It is a micromachined semiconductor fabricated using Microelectromechanical Systems MEMS technology. An example is the ADXL-05 from Analog Devices of Norwood, Mass. Accelerometer 86 is mounted on the sensor board such that it measures G forces along the vertical axis of the aircraft. It is used to determine if the aircraft has been subjected to severe structural stresses during a flight. Examples are sudden changes in altitude during turbulent conditions, unusual attitudes during a stall, spin or aerobatic maneuver and hard landings, especially if the aircraft is being used for training.

The output of accelerometer 86 is a DC voltage proportional to the G force and an offset and scale factor adjustment circuit 88 sets the output to the proper calibration. Circuit 88 consists of a resistor network with a variable component and some bypass capacitors. A filter 90 consisting of a resistor-capacitor circuit removes high frequency noise. The resulting analog signal represents vertical G force and is connected to one of the analog inputs of microcontroller 38 of FIG. 2.

Outside air temperature is measured using a solid state temperature sensor 92. It is an integrated circuit that generates a DC voltage that is directly proportional to the temperature of the air surrounding it. It is installed near the cabin vent inlet of the aircraft. An example of this sensor is LM35 from National Semiconductor of Sta. Clara, Calif. Two wires connect sensor 92 to a differential amplifier 94 that provides some gain and a low impedance output. The resulting analog signal represents outside air temperature and is connected to one of the analog inputs of microcontroller 38 of FIG. 2.

For certain types of aircraft, the position of the flaps is determined by detecting the DC voltage across the flap position indicator terminals on the aircraft's instrument panel. As the flaps move, the voltage changes. An input overvoltage protection circuit 96 clamps high voltage transients which can be induced by switching loads in the aircraft's electrical system or by natural phenomena such as lightning. A level converter and buffer shifts the DC voltage from the flaps indicator so that the converter output is zero volts when the flaps are in the neutral position. A differential amplifier, with one of the inputs connected to an adjustable voltage reference circuit 100, is used for this purpose. The resulting analog signal represents flap position and is connected to one of the analog inputs of microcontroller 38 of FIG. 2.

Other types of aircraft do not have an electric flap indicator and the flap position is determined by detecting the presence of current flowing through the flap motor. A Hall effect current sensor 102 is used. It is in the form of a ring through which the wire being sensed is inserted. It consists of a small sheet of semiconductor material with a constant voltage applied across its length, causing a constant current to flow, called the Hall current. The Hall voltage, which is the one measured across the width of the sheet, is zero in the absence of a magnetic field. Once a magnetic field is applied with flux lines at right angles to the Hall current, a Hall voltage is generated that is directly proportional to the strength of the magnetic field. The magnetic field can be caused by current flowing through the wire, as in the case of the flap motor sensing application. The Hall voltage is amplified and a Schmitt trigger is used to convert it to a discrete level signal, functions which are built into sensor 102. Examples of companies which manufacture Hall effect current sensors are Allegro Microsystems of Worcester, Mass. and Amploc of Goleta, Calif. A buffer 104 is an operational amplifier that provides some current gain and a low impedance output. The resulting analog signal represents flap position and is connected to one of the analog inputs of microcontroller 38 of FIG. 2.

An air pressure sensor 108 is a semiconductor device that generates a DC voltage proportional to the static air pressure and hence, the barometric altitude. An example of this device is MPX4115 from Motorola Semiconductor of Phoenix, Ariz. The output of said device is a DC voltage directly proportional to air pressure. To filter any noise from the sensor, a noise decoupling filter 110 is used. The resulting analog signal represents barometric altitude and is connected to one of the analog inputs of microcontroller 38 of FIG. 2.

Aircraft pitch is measured using an accelerometer 112, a micromachined semiconductor device fabricated using MEMS technology. The device measures pitch angle by detecting changes in the gravitational force exerted on a suspended beam which is micromachined into the device. An example of accelerometer 112 is the ADXL210 from Analog Devices of Norwood, Mass. Its output is a DC voltage proportional to the tilt or pitch angle. A buffer 114 is used to prevent accelerometer 112's output from being loaded. A low pass filter 116 removes undesirable noise that may be present on the output of the buffer 116. The resulting analog signal represents pitch angle and is connected to one of the analog inputs of microcontroller 38 of FIG. 2.

A piezoelectric vibrating gyroscope 118 is used to measure the aircraft's roll angle. Gyroscope 118 works on the principle that a coriolis force results when an angular velocity is applied to a vibrating object. The force causes a piezoelectric element to generate a voltage proportional to angular velocity. This velocity is integrated by the program on the controller module 20 to produce angular displacement. An example of a manufacturer of this sensor is Murata Electronics of Smyrna, Ga. An amplifier 122 provides the necessary gain for the output of gyroscope 118 and a low-pass filter 124 removes unwanted high frequency noise. The resulting analog signal represents roll angle and is connected to one of the analog inputs of microcontroller 38 of FIG. 2.

The power supply for the sensors and signal conditioning circuits are provided by a combination of the 5 volts output of regulator 62 of FIG. 2 and the aircraft's unregulated electrical supply. For circuits directly connected to the aircraft's power supply, regulation is accomplished by using zener diodes in the individual circuits.

Figure 4:
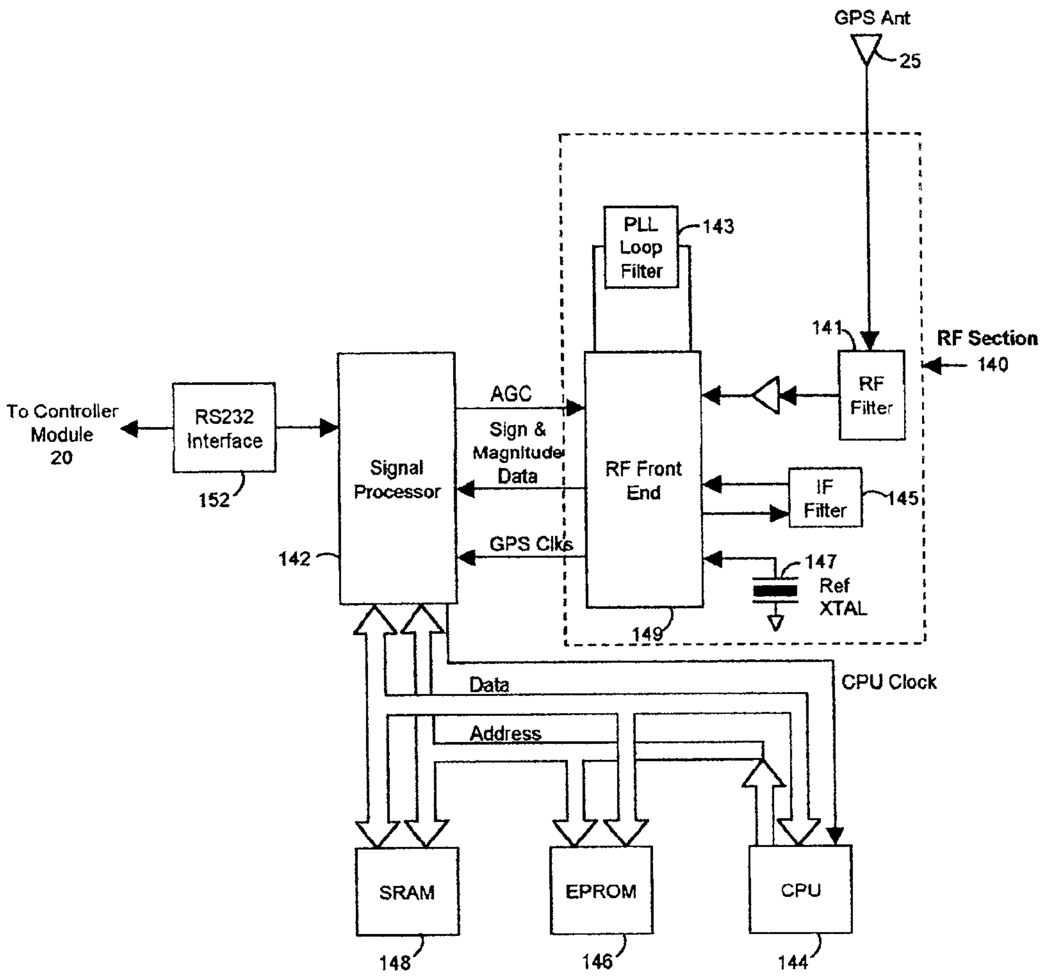
FIG. 4 is the block diagram of the GPS receiver module

FIG. 4 is the block diagram of GPS receiver module 24 of FIG. 1. Antenna 25 is basically a PCB with the copper pattern serving as the antenna. It is also called a dielectric patch and its approximate dimensions are 40 mm×40 mm. GPS technology operates in the microwave band of around 1.5 Ghz thereby allowing antennas of small sizes. Antenna 25 is typically mounted by taping it to the inner side of the sloping rear or front windshield of the aircraft.

A radio frequency (RF) section 140 consists of several elements including a RF filter 141 that allows only the desired signal band to pass through. It also has a RF front end 149 which is an integrated circuit that performs the function of down converting the RF signal to the intermediate frequency (IF) signal, amplifying the IF signal, filtering it using the IF filter 145 and converting it to two digital components: the sign and the magnitude, using on-chip analog-to-digital converters. A phase locked loop filter 143 is used for the down converters oscillator built into RF front end 149 together with reference crystal 147 which serves as a time base. The gain of the RF front end IF amplifier is controlled by the automatic gain control (AGC) signal. GPS dock signals are also generated by the RF front end's internal oscillator.

The GPS signals from the satellites are modulated using direct sequence spread spectrum with a pseudo-random code specific to each satellite. A signal processor 142 is an application specific integrated circuit (ASIC) that regenerates the pseudo-random code and de-spreads the GPS signal to form the baseband signal. It also has an interface to an external central processing unit (CPU) and a serial port for communicating with the host.

An external CPU 144 is a microprocessor that is interfaced to signal processor 142 through a data and address bus. It runs its code from an EPROM 146 and uses a SRAM 148 as the memory for performing its data processing and calculation functions. Its main function is to read the raw data from signal processor 142 and implement channel tracking and navigation calculations. The GPS receiver is capable of receiving signals from several satellites simultaneously by having as many as 12 channels. In an ideal situation, at least 4 satellites are needed to determine the receiver's position. CPU 144 estimates the arrival time of the signals from each satellite and using this information and the known position of the satellite in orbit, the receiver's position in terms of latitude and longitude is computed. The resulting data is sent out through a serial port through an internal bus in signal processor 142. The serial data is converted to RS232 levels using a RS232 interface 152 before it is interfaced to controller module 20 of FIG. 1.

Examples of companies manufacturing the GPS receiver module are Leadtek Research Inc. of Taipei Hsien, Taiwan and Axiomnav of Anaheim, Calif. Both use RF and signal processor chipsets from SiRF Technology Inc. of Sta. Clara, Calif.

Figure 5:
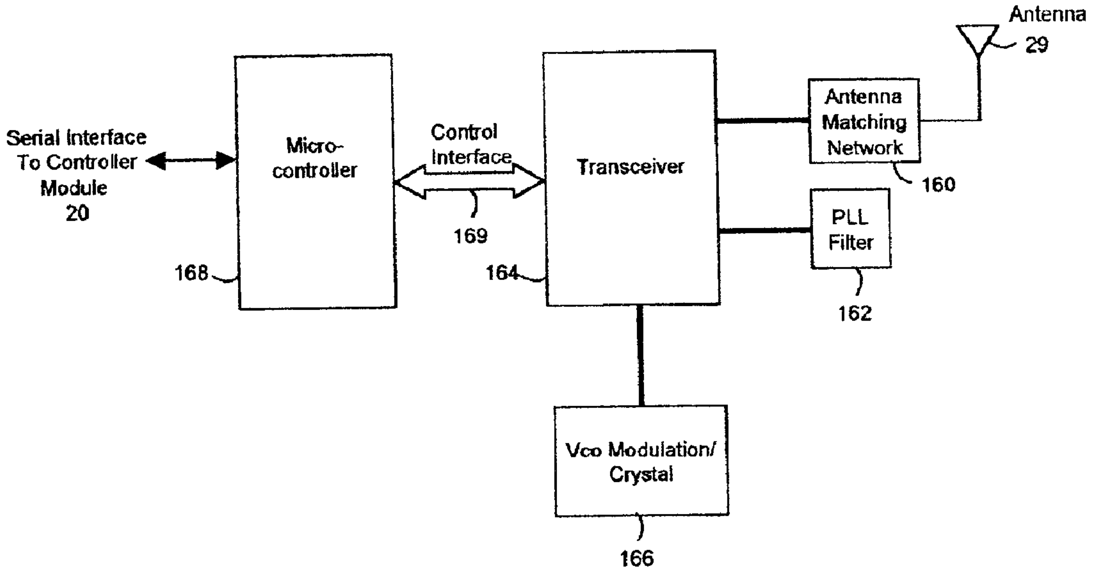
FIG. 5 is a block diagram of the RF data transceiver module

FIG. 5 is the block diagram of the RF data transceiver module 28 of FIG. 1. The operating frequency of the data transceiver is in the UHF range, from 300 to 500 Mhz. Antenna 29 receives and transmits radio signals and is a PCB or patch antenna. Its impedance is matched to the rest of the circuit using an antenna matching network 160 which consists of an inductor/capacitor network. A transceiver 164 is an ASIC that performs the function of receiving and transmitting the UHF signals using frequency shift keying (FSK) modulation.

The receiver section of transceiver 164 consists of a low noise amplifier, a quadrature mixer, a local oscillator, some filters and a demodulator. The transmit section consists of a voltage controlled oscillator (VCO) and a power amplifier.

Common to both sections is a frequency synthesizer that allows operation over a wide range of frequencies and a control interface that allows an external host to control transceiver 164. The power output is in the range of several milliwatts since this transceiver is designed to work over short distances, namely, 50 to 100 meters. Data retrieval is accomplished when the aircraft is on the ground and parked. A portable PC can be brought near the aircraft or a host PC located in a nearby hangar can be used. This way, the need for an expensive and high power consuming data communications device on the flight data recorder is avoided.

A phase locked loop filter 162 provides the necessary filtering for the internal frequency synthesizer of transceiver 164. A VCO modulation and crystal circuit allows the transmit data signal to modulate the frequency of the transmit VCO of transceiver 164.

Demodulated data and transmit data are accessed through the control interface of the transceiver. It is basically a serial interface that allows an external host to program the operation of transceiver 164. This includes setting the frequency dividers for the frequency synthesizer, the filter cutoff, modulation mode, receive and transmit mode. The typical transmission rate is 9600 bps.

A microcontroller 168 controls the operation of transceiver 164, performs Manchester encoding and decoding and formats the data into asynchronous form for interfacing to controller module 20. Manchester encoding is a frequently used method for encoding data that is sent through a radio frequency or wireless medium. The program that microcontroller 168 runs is stored in an internal PROM. Examples of companies manufacturing this kind of integrated circuit is Microchip Technology Inc. of Chandler, Ariz. and Zilog Inc. of Campbell, Calif.

Examples of companies manufacturing data transceiver module 28 or similar products are Blue Chip Communications of Oslo, Norway and Radio-Tech Co. Ltd. of U.K. Two transceiver modules are needed: one for the flight data recorder and the other for the data retrieval unit.

Figure 6:
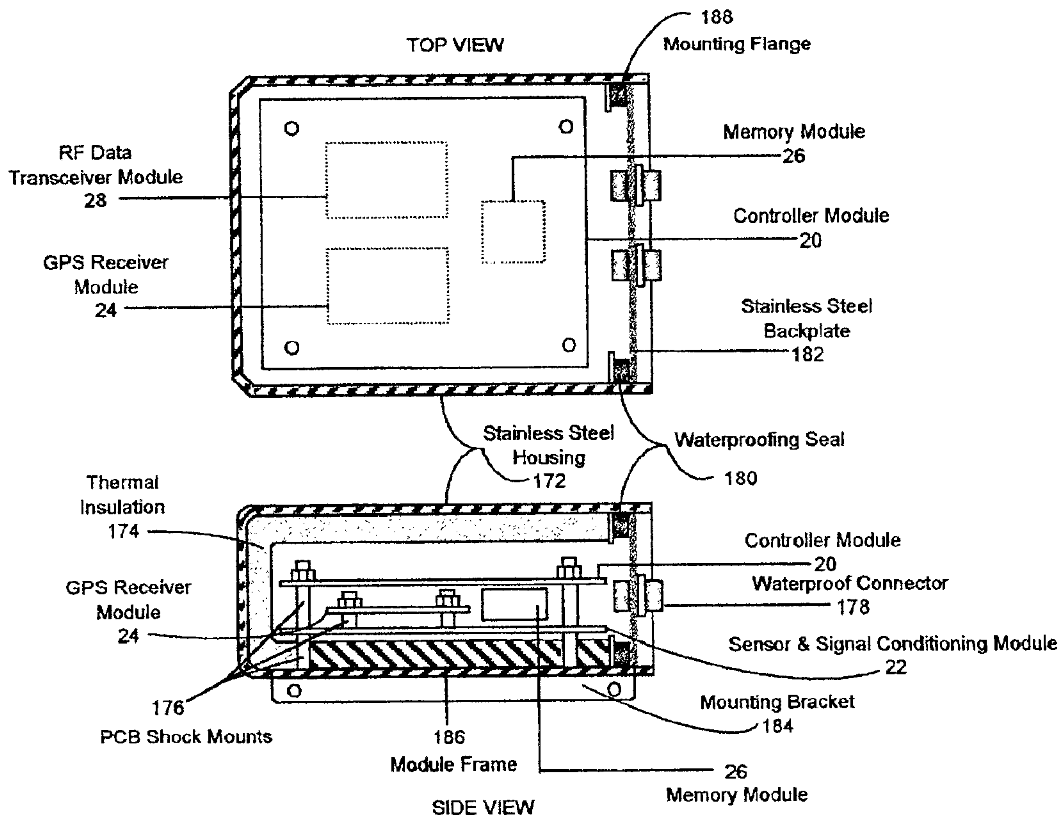
FIG. 6 illustrates the enclosure of the flight data recorder

FIG. 6 is an illustration of the enclosure and layout of the modules comprising the flight data recorder. A stainless steel housing 172 made of stainless steel sheet which are fully-welded on the joints serve as the first layer of protection of the flight data recorder against impact, fire and water. A thermal insulation 174 made of silica-based panel protects the modules from the heat, serving as the second layer of protection against fire. An example of a company manufacturing such an insulation is Microtherm of U.K. The modules are secured by PCB shock mounts 176 which are made of rubber. These help in reducing the effects of continuous vibration of the aircraft and in absorbing the impact of a crash.

Access to the enclosure is accomplished through the back which is covered by a stainless steel backplate 182. Water is prevented from entering backplate 182 using a waterproofing seal 180. Backplate 182 is secured to the enclosure by screws which go through the seal and screw to a mounting flange 188. Wires go through the backplate using a waterproof connector 178. All wires going out of the enclosure are fireproof. An example of a company manufacturing fireproof and waterproof cabling and connectors is Bay Associates of Menlo Park, Calif.

The modules are all mounted in a single module frame 186 which is made of aluminum extrusions. To remove the module assembly, module frame 186 is simply unscrewed from mounting flange 188 and the whole assembly is pulled out.

Figure 7:
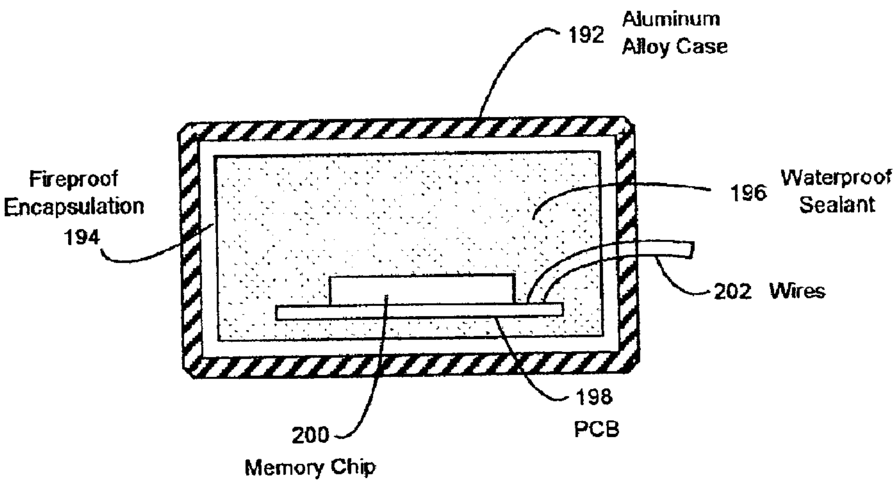
FIG. 7 illustrates the enclosure of the memory module

FIG. 7 illustrates the enclosure for memory module 26. Said enclosure serves as the final line of defense against shock, fire and water. The outer housing is a machined aluminum alloy case 192, followed by a waterproof and fireproof encapsulation 194 and a fireproof and waterproof sealant 196 made of specially formulated 2-part silicone. An example of a manufacturer of sealant 196 is Dow Coming of Midland, Mich. Encapsulation 194 is made of glass-fiber filled Diallyl Phthalate. An example of a manufacturer for the encapsulation material is Robison Electronics of San Luis Obispo, Calif.

A memory chip 200 is soldered on printed circuit board 198. Several wires 202 are connected to PCB 198 and come out of the module to connect to the controller module 20. Wires 202 are also fireproof.

In case most of the internal parts of the flight data recorder are damaged, there is still a high probability of recovering the recorded data since memory module 26 has its own set of protective enclosures. With this method the overall enclosure cost is reduced since the degree of protection can be concentrated on memory module 26 which is a much smaller object compared to the whole data recorder.

Figure 8:
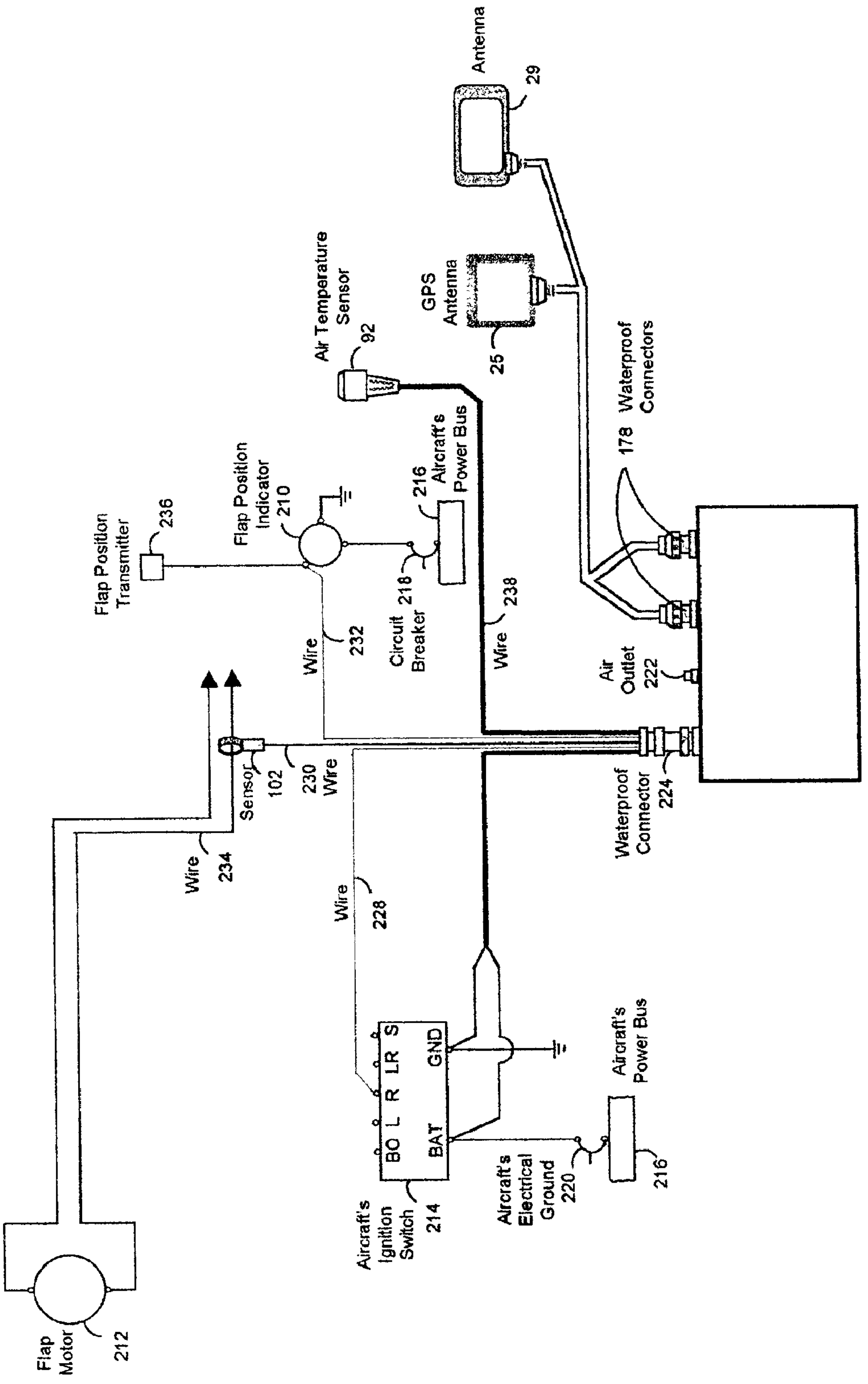
FIG. 8 is a typical installation diagram of the flight data recorder in an aircraft

FIG. 8 is an example of the installation diagram of the flight data recorder in a typical single engine aircraft such as a Cessna 172. Two waterproof connectors 178 on the flight data recorder are for the antenna cables while another waterproof connector 224 is for the power and sensor cables. Although three connectors are shown although it is also possible to just have a single connector for all the wires. GPS antenna 25 and data transceiver antenna 29 are mounted on the interior side of the rear windshield by using double-sided tape. This location assures that GPS antenna 25 is always in view of the overhead GPS satellites. It also assures that there is no metal part blocking data transceiver antenna 29.

Air outlet 222 is connected to air pressure sensor 108 which is installed inside the flight data recorder. For non-pressurized aircraft, the static air pressure inside the cabin is basically the same as outside the aircraft.

Power for the flight data recorder is provided by a pair of wires which are connected to the battery and ground terminal of the aircraft's ignition switch 214. Said ground terminal is connected to the aircraft's electrical ground 220. The battery terminal is connected to the aircraft's power bus 216 through a circuit breaker 220.

A wire 228 is connected to either the Right Magneto or Left Magneto terminal of ignition switch 214. This is used for monitoring engine RPM. A wire 230 connects to hall effect current sensor 102 which senses the current passing through wire 234 which is supplying current to flap motor 212. This is for aircraft which are not equipped with flap position indicators.

For aircraft with flap position indicators, wire 232 connects to the terminal of flap position indicator 210. The terminal used is the one which connects to the flap position transmitter 236 of the aircraft. Power for flap position indicator 210 is provided by the aircraft's power bus 216 through a circuit breaker 218.

A pair of wires 238 connect to air temperature sensor 92 which is mounted on the cabin vent inlet by tying it with a cable tie.

The other sensors of the flight data recorder are mounted inside the recorder.

Figure 9A:
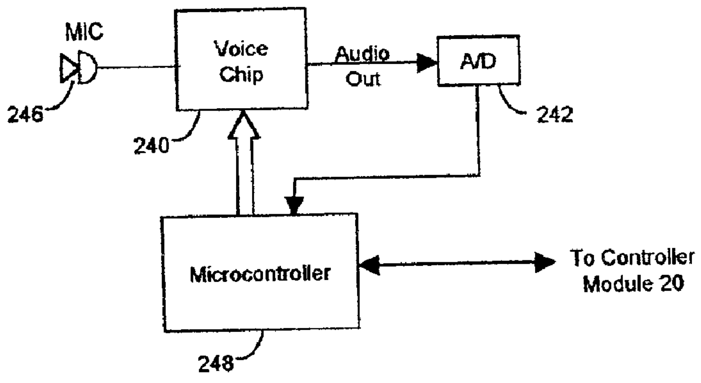
FIG. 9A is the cockpit voice recorder.

Referring to FIG. 9, the block diagrams of the optional accessories of the flight data recorder are shown. FIG. 9A is the block diagram of the cockpit voice recorder. A microphone 246 picks up the crews voice signals inside the cockpit and a voice chip 240 records the voice signal in its memory. Voice chip 240 is also capable of playing back the recorded voice signal in analog form. The voice signal is converted to digital by a serial analog-to-digital converter 242. A microcontroller 248 controls the operation of the voice chip and communicates with controller module 20 through a serial port. The digitized voice signals are sent by the microcontroller to the controller module, which stores it in non-volatile memories 56 and 26. Since the voice chip has its own memory, it is also possible to playback the voice signal directly from the voice chip output. The cockpit voice recorder is housed in its own waterproof, impact proof and fireproof enclosure and is mounted in the vicinity of the aircraft crew. An example of a company manufacturing the voice chip is ISD of San Jose, Calif. It has its own analog voice memory that with a typical capacity of 8 minutes. It stores and plays back the most recent voice signals.

Figure 9B:
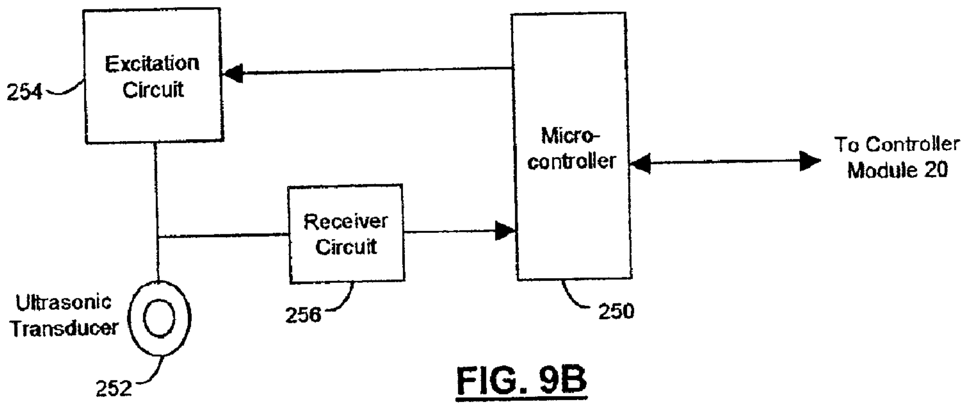
FIG. 9B is the underwater transceiver unit and FIG. 9C is the LCD display unit.

FIG. 9B is the block diagram of the underwater communications data transceiver. An ultrasonic transducer 252 generates high frequency acoustic signals when transmitting and generates electrical signals when receiving. An excitation circuit 254 applies the necessary voltage levels for the transducer to transmit. A microcontroller 250 generates the excitation signal, which is basically the encoded data being transmitted by controller module 20. When it is receiving, a receiver circuit 256 amplifies the weak signals from the transducer and converts it to digital pulses which are decoded by microcontroller 250 and passed on to controller module 20. Two underwater transceivers are needed: one for the aircraft, the other for the data retrieval unit. The underwater transceiver on board the aircraft is housed in its own waterproof, impact proof and fireproof enclosure and is mounted near the flight data recorder. Transducer 252 has an omnidirectional radiation pattern and is mounted on the inner side of the aircraft windshield. Examples of companies manufacturing underwater ultrasonic transducers for communications applications are Hexamite of New South Wales, Australia and Neptune Sonar Ltd. Of East Yorkshire, England.

Figure 9C:
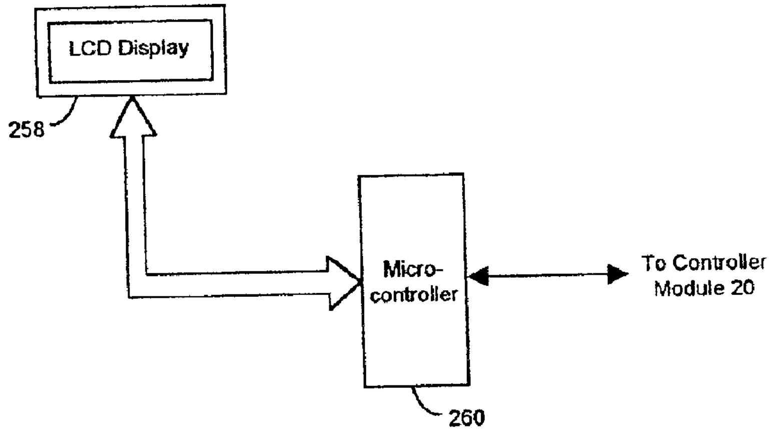

FIG. 9C shows the block diagram of the cockpit display module. A microcontroller 260 receives serial data from controller module 20 and converts the data to a form that can be displayed by a liquid crystal display module 258 which can be either alphanumeric or graphic type. The display module is housed in its own enclosure and mounted on the aircraft's instrument panel. It displays the position and sensor data collected by controller module 20 on a real-time basis.

Operation

To describe the operation of the flight data recorder, an overview of the way in which data is organized is first provided.

The flight data recorder uses two types of memory location, one is flash memory 56 while the other is the smaller non-volatile static ransom access memory (SRAM) which is part of the real-time clock chip (RTC) 52. Between the two, the flash memory is considered as more stable as the RTC NVSRAM relies only on its back-up battery to retain data. Hence, upon power-up, the RTC NVSRAM is checked for errors, in case the battery is used up after a long period of dormancy, or in case a power disconnection occurs due to impact of an accident.

There are three types of data stored in the non-volatile memory: the data records, the group records, and the system state. A data record contains the GPS location data consisting of differences in coordinates between previous and current readings or deltas. The deltas are stored in BCD (Binary Coded Decimal) format. Also included in this record is the GPS time stamp in BCD and the sensor readings in 10-bit binary format per reading. Data records are stored in the flash memory. With this format, the memory space is optimized. As an example, a 1 Mbyte flash memory can store data equivalent to approximately 70 hours of flying time assuming an average recording interval of 4 seconds.

A group record contains address pointers to a set of data records, the date stamp, and the absolute GPS coordinates. A group record is created every time there is an interruption in the operation of GPS receiver module 24 caused by temporary disturbances, malfunction or a change of date. This is necessary since what are being stored in the data records are relative positions. In the computer 32 of the data retrieval unit, the absolute coordinates are determined by adding the existing delta to the previous absolute coordinate. If the deltas overflow, there is a need to store the absolute coordinates in the flight data recorder to avoid errors. The group records are stored in the flash memory 56. The date stamp is derived from RTC 52 while the address pointers refer to the first and last record of the data group being described by the group record.

The system state state contains information regarding the current state of the system, such as flags and pointers to relevant group records. These data are located in the non-volatile SRAM of RTC 52. It consists of pointers to the first group record and the current group record, as well as a copy of the current group record.

Figure 10A:
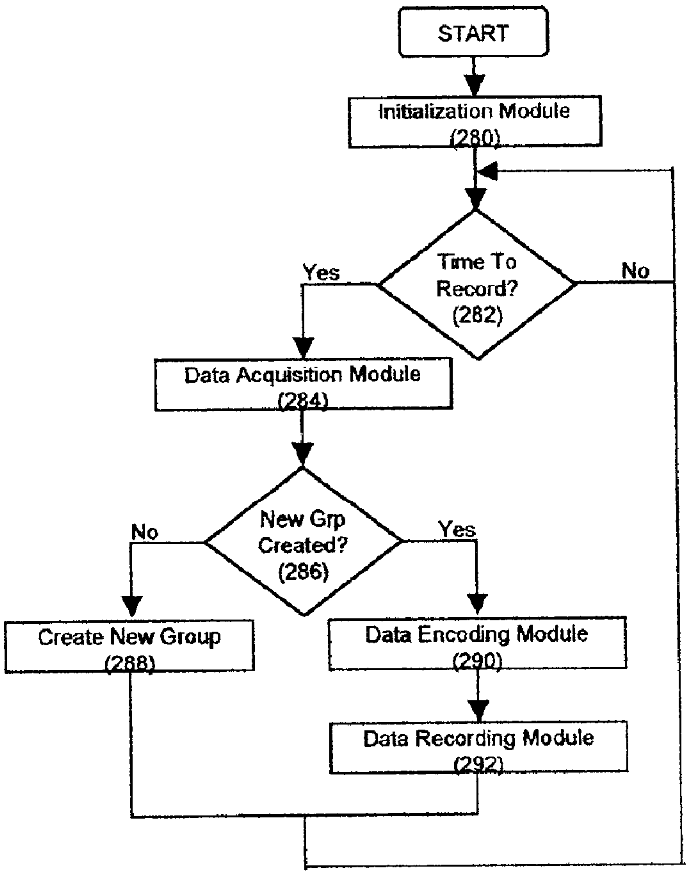
FIG. 10A is the flowchart of the main program of the flight data recorder.
Figure 10B:
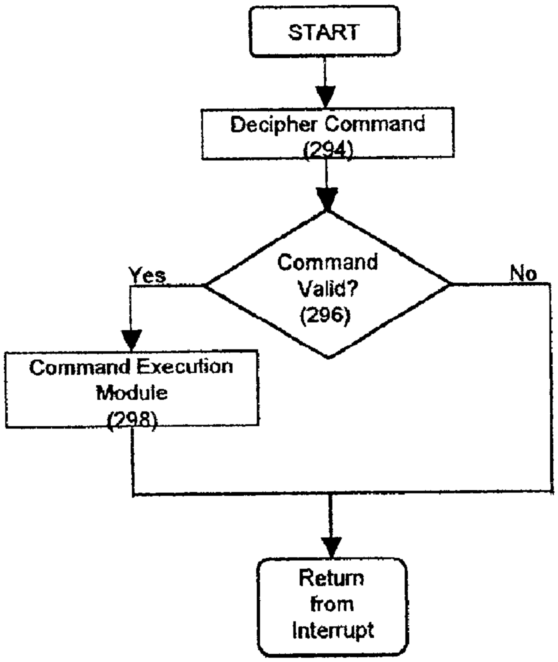
FIG. 10B is the flowchart of the user command interrupt routine and FIG. 10C is the flowchart of the timer interrupt routine.
Figure 10C:
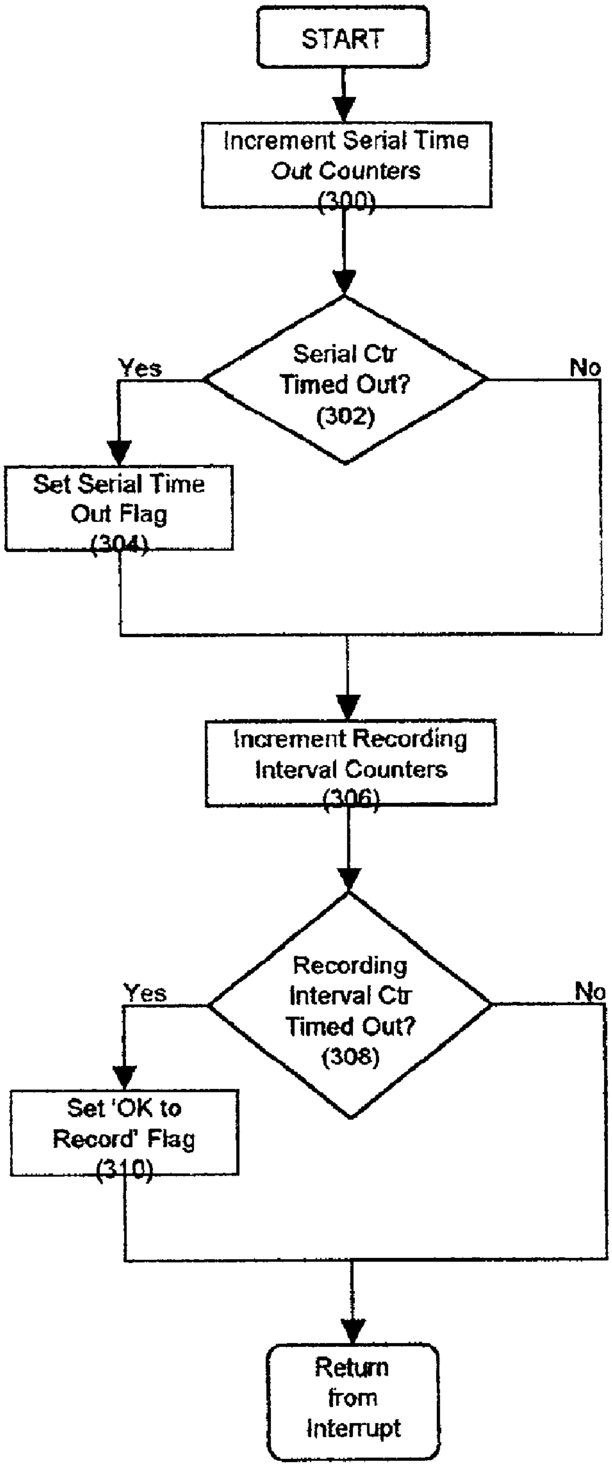

FIGS. 10A, 10B and 10C are the flowcharts of the main program executed by microcontroller 38 of controller module 20. It is basically an endless loop performing data acquisition and data-recording functions with the other functions taking place in the background as interrupt routines. As shown in FIG. 10A there are four main parts of the program and they are the initialization module 280, data acquisition module 284, data encoding module 290 and the data recording module 292.

The program starts by initializing the system 280, primarily the ports, timers, counters, the RTC and the GPS module. The program then checks if it is already time to record as determined by the current recording interval 282. If it is time to record, the system will acquire data then check if it still needs to create a new group record 286. If no current group record exists, a new group is created 288, else the program proceeds with its normal operation of encoding the acquired data then storing it in the flash memory.

On the background of the program operation, two interrupt modules facilitate the timers and the user communication operation. FIG. 10B is the command interrupt routine which is executed when the controller module 20 receives a command from the data retrieval unit through data transceiver 28. The command is deciphered 294 and if it is valid 296 it is executed 298. FIG. 10C is the timer interrupt that basically exists for the detection of serial time outs 302 and for the maintenance of an accurate recording interval 308. The serial time out flag 304 is set if the time out period is reached and the record flag is set 310 is set if it is time to record. Otherwise, the counters will just continue to increment 300 and 306 on the next interrupt.

Figure 11:
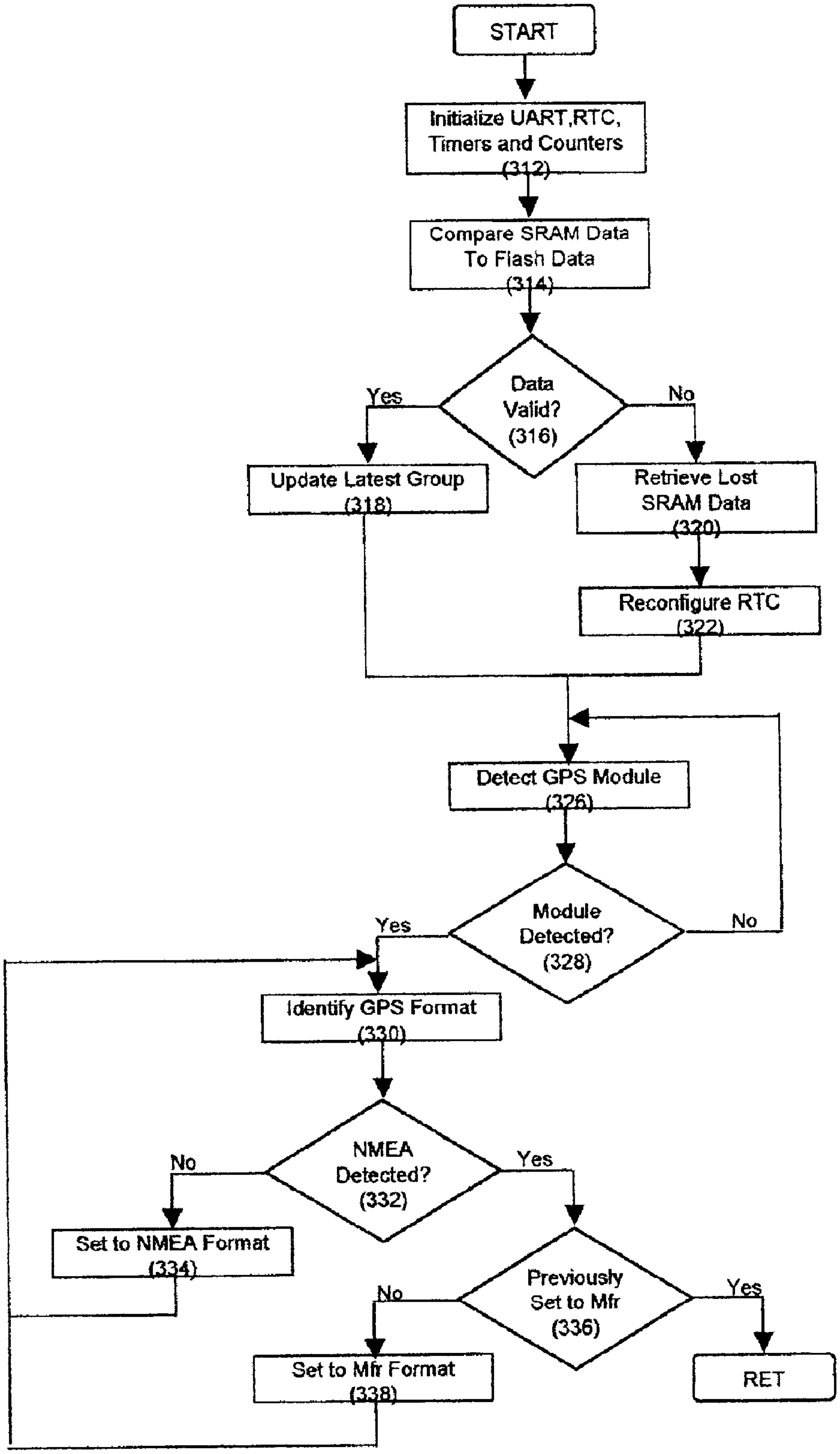
FIG. 11 is the flowchart of the initialization module.

In FIG. 11 is the flow chart of the initialization module 280. The system is initialized by first initializing the ports, timers, counters and the Real-Time Clock 312. The next step is to check the validity of the RTC SRAM by first comparing its contents to its counterpart in the flash memory module 314. If the RTC SRAM is valid 316 the program updates the previous group 318 by updating the last-record pointer of the group in the flash memory area. The group update routine is necessary because normal operation cannot update the current group, as the system's termination cannot be predicted. If however an RTC error is detected, the system assumes that the data in the RTC SRAM and the date of the RTC are invalid. Therefore, it proceeds with the retrieval of lost SRAM data by reading the flash memory 320, then reconfiguring the RTC date and time to a default state 322. The next step is to initialize the GPS module. Before initializing the GPS, the program performs a GPS module detection routine 326 to assure that the GPS module is working properly. The GPS format is identified 330 by interrogating it and if the format is not NMEA 332, the GPS module is set to NMEA 334. If it is already NMEA 332 then the GPS module is initialized by setting it to the manufacturer's format first 338, then to NMEA format 334.

Figure 12:
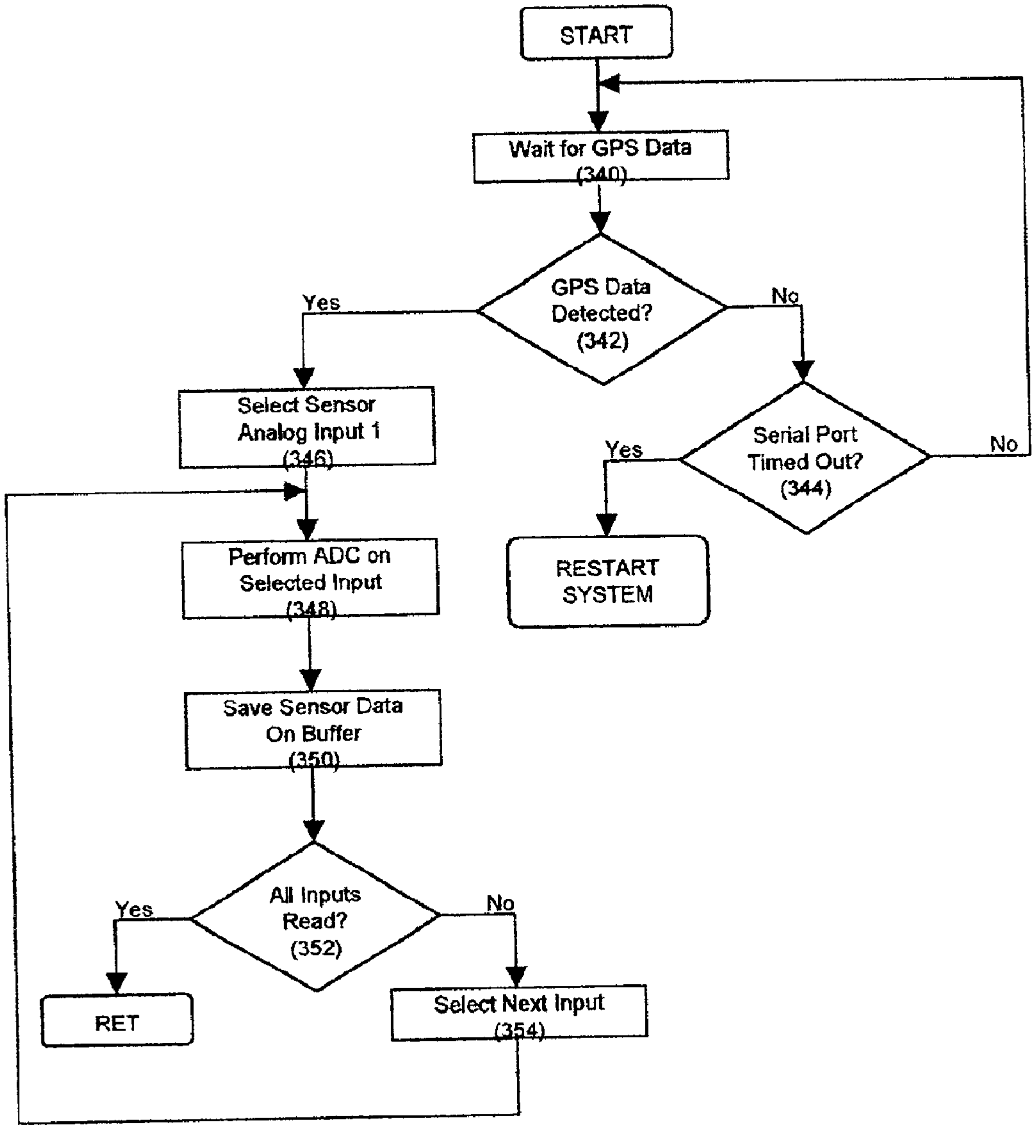
FIG. 12 is the flowchart of the data acquisition module.

FIG. 12 is the flowchart of the data acquisition module 284. This module acquires the GPS data from the GPS module then reads the sensor ports on the analog inputs of microcontroller 38 to obtain the sensor readings. The module starts by waiting for GPS data from the GPS module 340. If data is not detected after a certain time out period 344, the system will reset to reinitialize the GPS system. After the acquisition of the GPS data, the program proceeds with the sensor data acquisition by performing analog-to-digital conversion on each analog input to which a sensor is interfaced 346, 348, 350, 352, 354 until the last input. The acquired data is stored in a temporary buffer 350.

Figure 13:
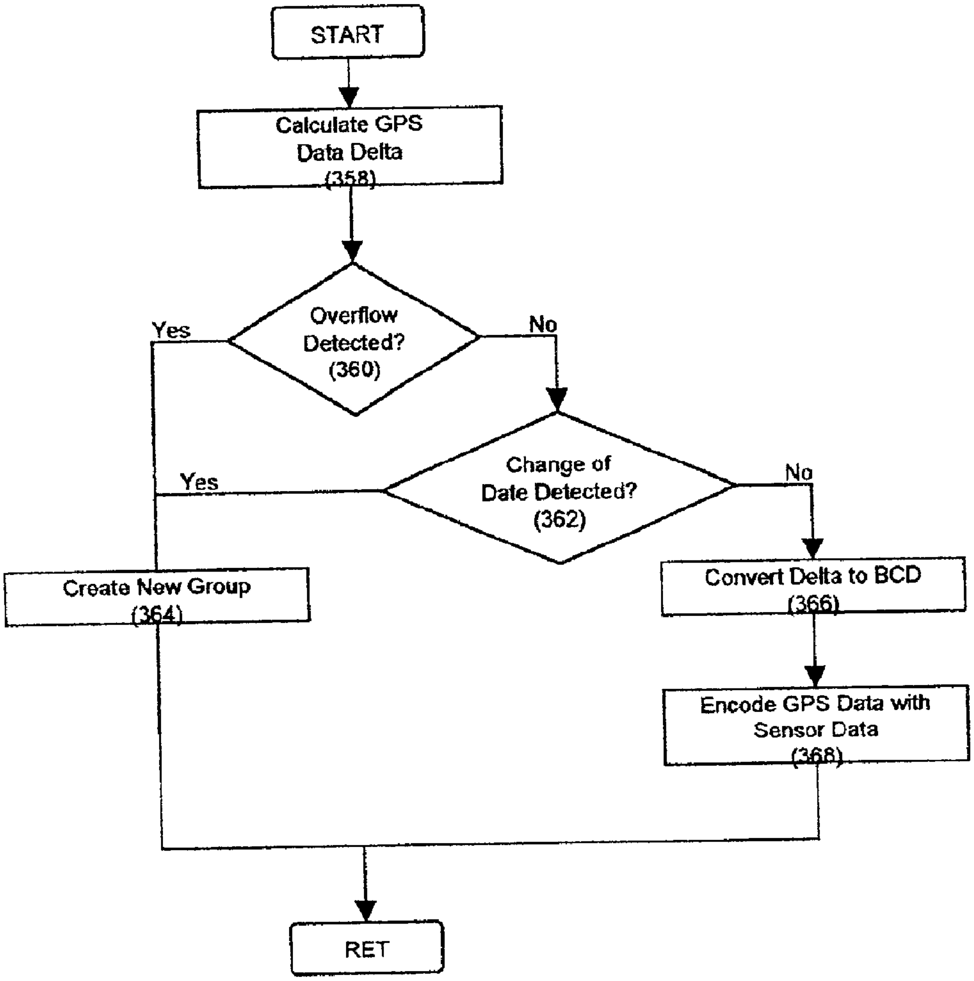
FIG. 13 is the flowchart of the data encoding module.

FIG. 13 is the flowchart of the data encoding module 290. The encoding of the acquired data involves a form of compression to optimize the use of the flash memory. This module starts by calculating the GPS delta 358, which is the difference between the current and previous absolute coordinates, and then checking for any overflow 360. An overflow is detected if the delta exceeds a preset limit. If an overflow occurs, the data record cannot accommodate the GPS delta, hence a new group is created 364. A new group is also created when the date changes 362, as the group is date stamped. If no overflow or date change is detected, the program proceeds with the encoding by converting the GPS data delta to binary-coded-decimal to further compress the data 366. Finally, the GPS data is integrated with the sensor data into the data record format 368.

Figure 14A:
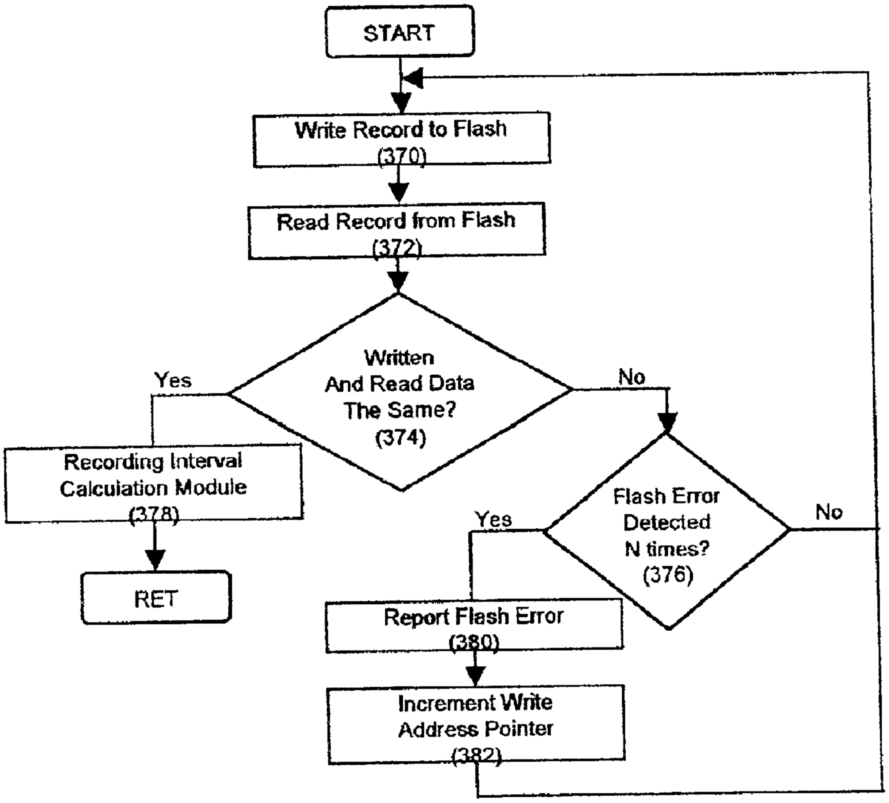
FIG. 14A is the flowchart of the data recording function and FIG. 14B is the flowchart of the variable interval recording function.
Figure 14B:
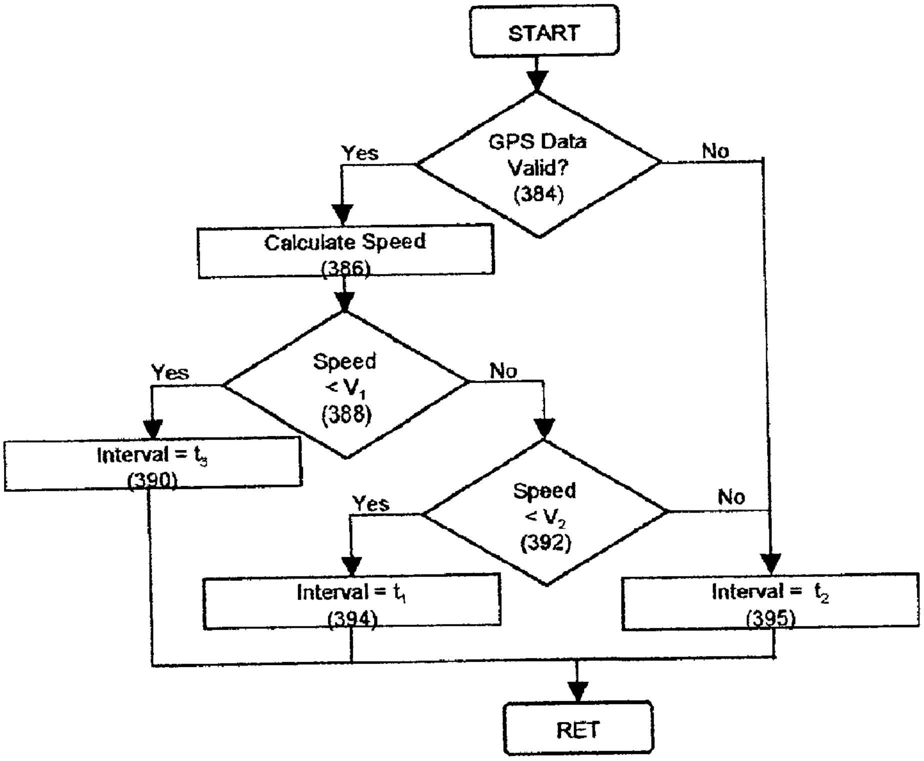

FIGS. 14A and 14B are the flowcharts for the data recording module 292. The flowchart of FIG. 14A performs data saving to the flash memory 370. Aside from this, the program also checks for any errors in flash recording by performing an immediate data read 372 then comparing the results for any errors 374. If an error is detected, the program will re-try writing up to a pre-set number of times 376 then reports an error if the problem still exists 380. At this point the program skips the flash memory location 382 and saves the data in the next available location. If the write operation is successful, the program proceeds with the calculation of the new recording interval to fit the frequency of data recording with the relevance of the current situation 378. This is shown in FIG. 14B. If the aircraft is in the taxiing stage (speed<$V_1$) the recording interval $t_3$ is large 390 since this is not a critical stage 390. If it is in the cruising stage (speed>$V_2$) the recording interval $t_2$ is medium 395. In the take-off and landing speed range ($V_1$ to $V_2$), this is the most critical stage and hence the recording interval $t_1$ is the shortest 394. The speed of the aircraft is based on the GPS data and RTC time, hence if the GPS data is found to be invalid 384, the recording interval is set to a default value. This variable recording interval method can be disabled by the user, in which case a fixed recording interval is used.

Figure 15:
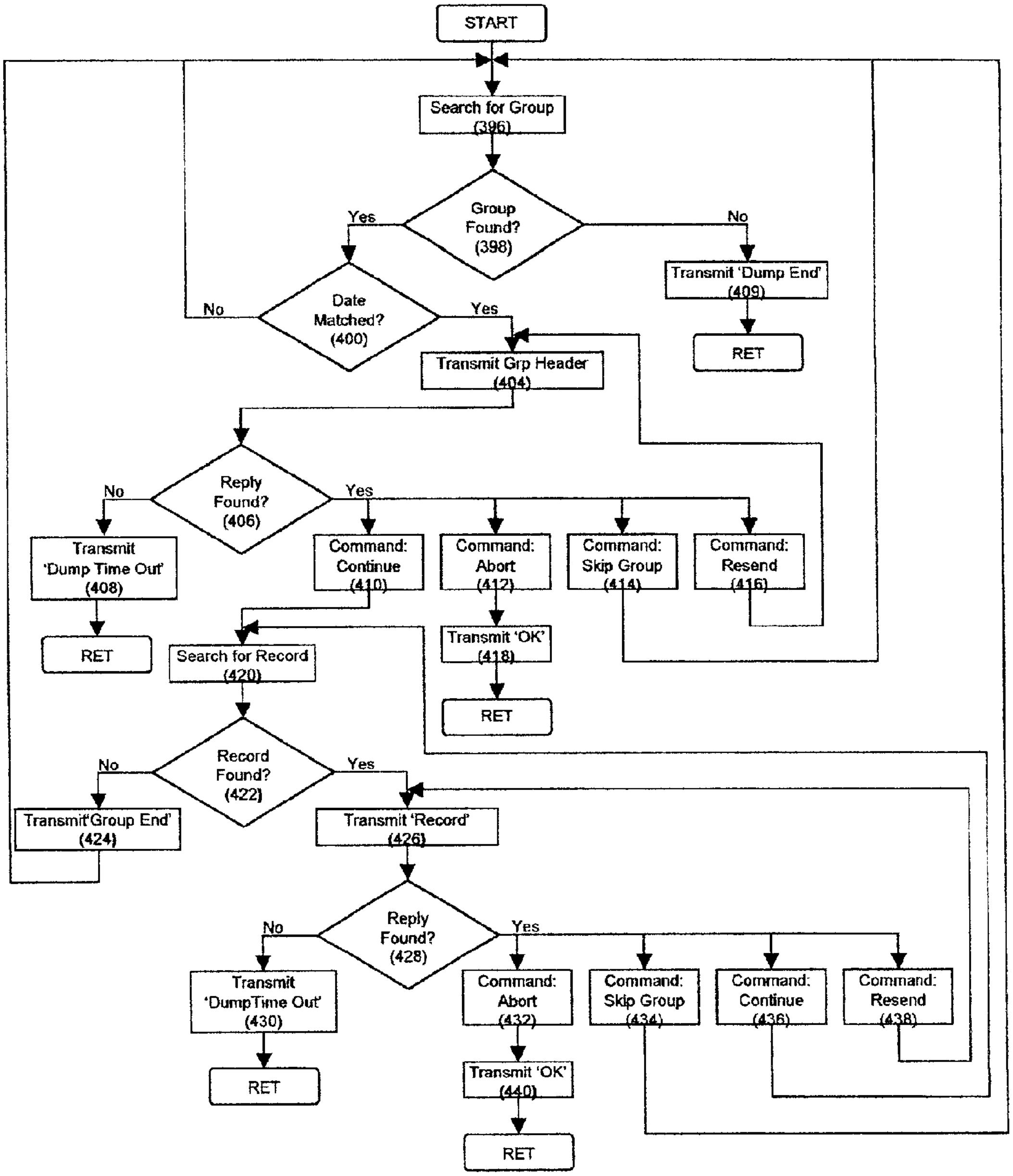
FIG. 15 is the flowchart of the data retrieval module.

The retrieval of data by the host computer 32 of the data retrieval unit is initiated by the command execution module 298 of the command interrupt routine of FIG. 10B. FIG. 15 is the flowchart of the data retrieval module. The routine first performs a linear search of the flash memory for existing groups 396. If a group is found, the data retrieval command date parameter is then compared to check if there is a match and this is the group the user needs 400. If the group date does not match the parameter, the program searches for another group. If they match however, the group header is transmitted 404.

This header contains the GPS reference data and the addresses of the first and last record in the group. The program then waits for a reply from the user 406. If a serial time out is experienced, the program transmits a 'dump time out' symbol 408. The reply can either be 'continue' 410, 'abort' 412, 'skip group' 414 or 'resend' 416. The 'abort' command ends the dump routine and transmits an 'OK' to signal that the command was received 418. The 'resend' command will send again the group header. The 'skip group' command will skip the group and searches for the next group, while the 'continue' command will make the program proceed with the dumping of the records in the group.

In dumping the contents of a group, the program first search for any record in the group 420 then transmits the data record 426. Again, the program waits for a reply from the user 428 then performs the same commands as above. If no reply is received, a 'dump time out' is transmitted 430. If a 'continue' command is received however 436, the program proceeds to dump the next record. If there are no more records to dump from the group, the program transmits the 'group end' symbol 424. The program then searches the flash memory again for the next group. If there are no more groups found, the program transmits the 'dump end' symbol 408.

The communications between the flight data recorder and data retrieval unit is in the form of frames, each of which consists of a starting symbol, the flight data recorder unit identification (ID) number, command or reply, data if applicable, a cyclic redundancy check (CRC) word and an ending symbol. The CRC is computed by the flight data recorder unit and checked by the host computer of the data retrieval unit. If there are errors, the transmission is re-sent until an error-free frame is received or the pre-set number of retries is reached.

Figure 16:
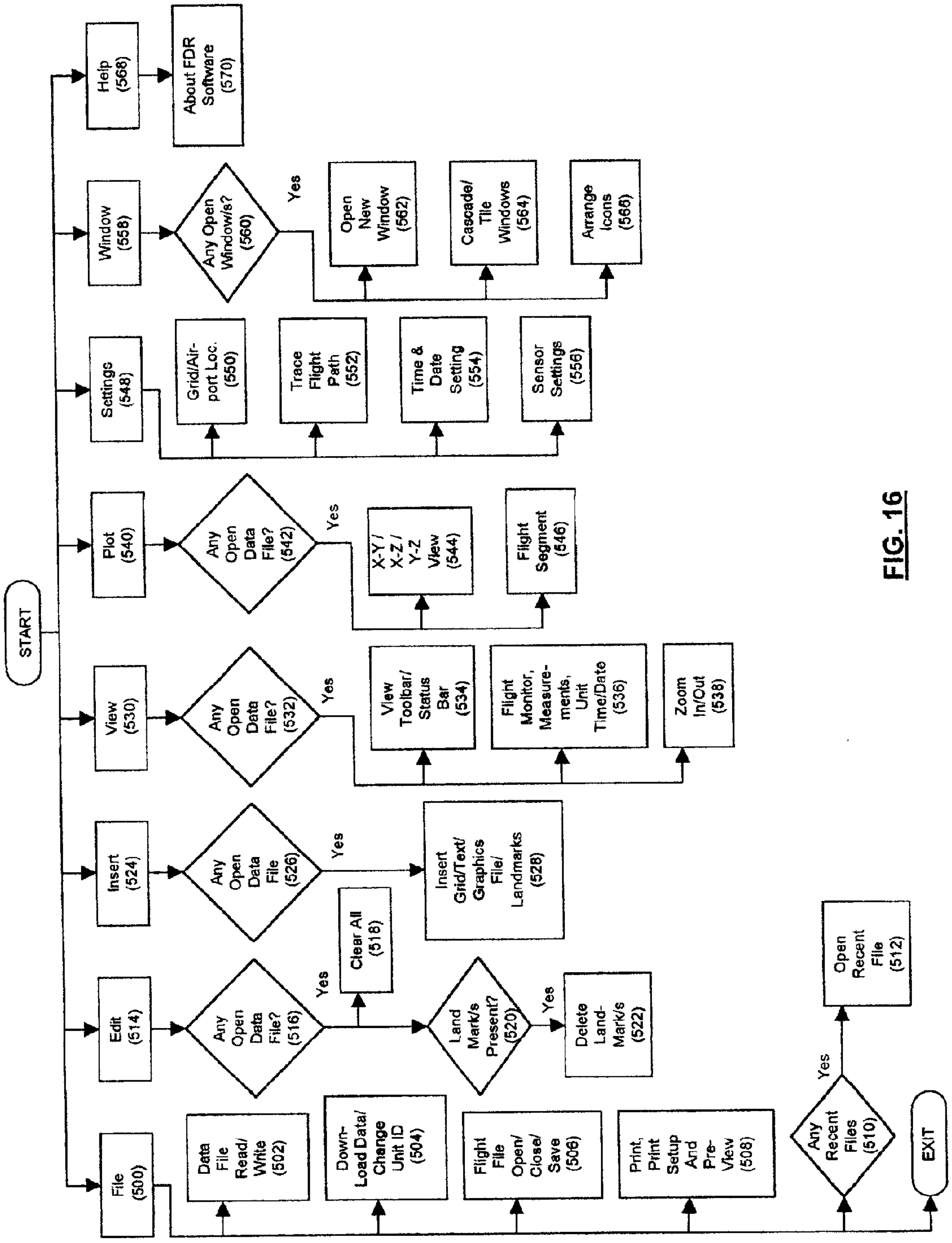
FIG. 16 is the flowchart of the main program on the host computer

FIG. 16 is the flowchart of the main program on the host computer 32 of the data retrieval unit. The available options from the main menu are as follows: File 500, Edit 514, Insert 524, View 530, Plot 540, Settings 548, Window 558, and Help 568.

The user can manage data and files using the File menu option. With this, the user can open a GPS or ASCII file 502 containing flight data, download flight data from the flight data recorder or change the data recorder unit ID 504, open, close or save flight data plots 506, setup the printer, view the print layout and print the flight data plot 508. If there are any recent files used by the program, a recent files menu 510 is activated and the user can click on any recent file on the list 512.

The Edit, Insert, View and Plot menu options can only be activated if there is at least one GPS or ASCII data file that is open 516,526,532,542. With the Edit menu, the user can clear the entire flight data plot on the screen 518, delete landmark/s 522 if any are present on the plot 520. The Insert menu enables the user to insert a grid, graphic file, text or landmarks on the flight data plot 528. The View menu gives the user options to view the toolbar, status bar 534, flight monitor, measurements, as well as the data recorder date and time 536. The user can also enlarge and normalize the flight data plot view using the zoom in/out option 538. The Plot menu is designed for enabling the user to see the X-Y, X-Z and Y-Z views of a flight data plot 544, also to view a segment of a flight data plot 546.

The Settings menu option 548 is for configuring the grid and airport location 550, data recorder time and date 554, sensor settings 556, and enables the user to trace the entire flight path on the data plot 552. The window menu option 558 is for managing windows in the program if any are open 560. Lastly, the Help menu option 568 contains information about the flight data recorder software 570.

Figure 17:
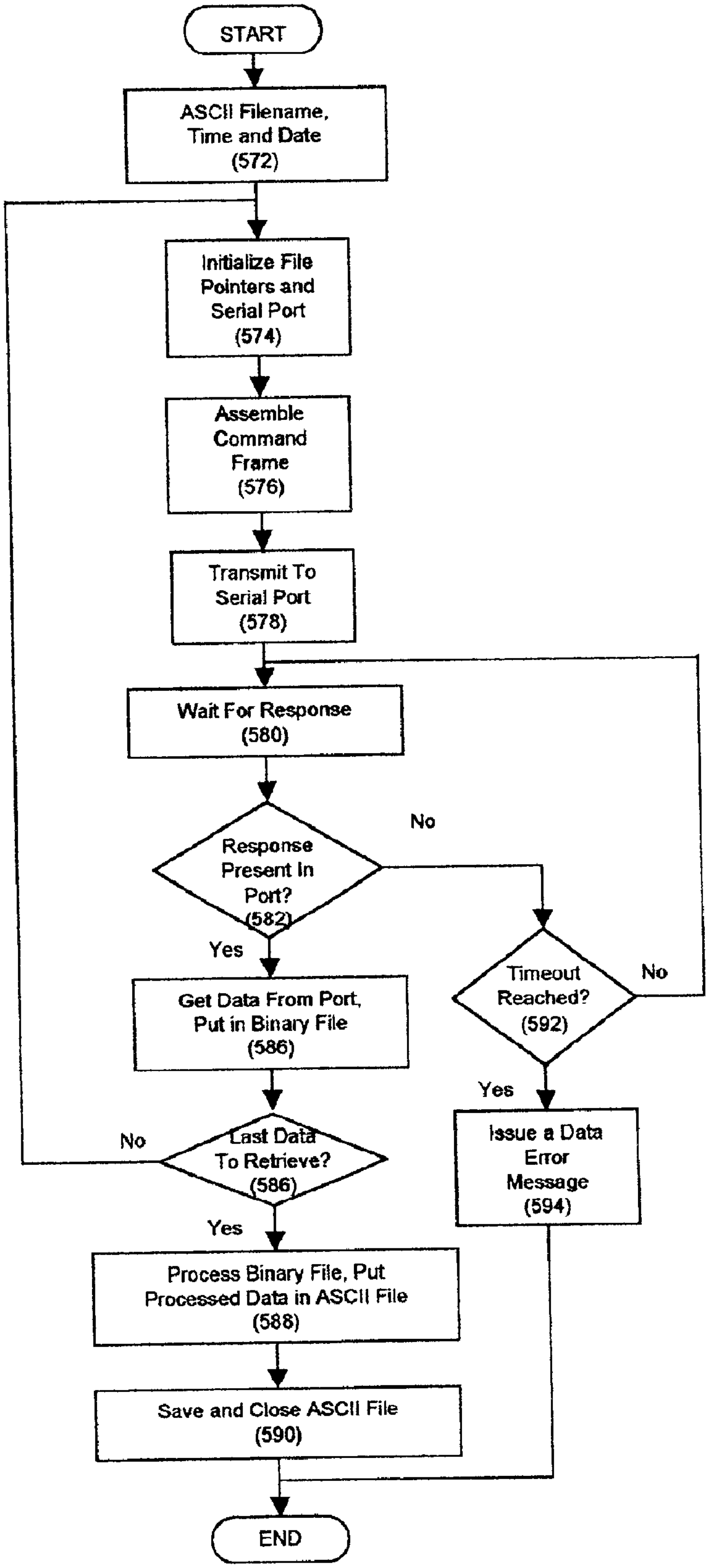
FIG. 17 is the flowchart of the data retrieval function on the host computer.

FIG. 17 is the flowchart of the data retrieval function on the host computer of the data retrieval unit. The first step in data retrieval requires an ASCII filename and a download date and time for input 572. The program begins to initialize its variables, file pointers and the computers serial port 574. A command frame containing the command, time and date of download, is assembled to send out through the computer's serial port 576. After sending the command to the flight data recorder 578, the program waits for a response 580. If the required number of bytes for the response is present in the port 582, the data are fetched from the serial port and placed in a binary file 584. If the response is not yet present in the port, the program waits until a specified timeout 592. If the timeout occurs, an error message is issued and the data retrieval program ends 594. If the current data is not the last data to be retrieved 586, the program goes back to issue a command frame and wait for the next data. Otherwise, the binary file is saved. The binary data is processed and the new data is stored in the ASCII data file 588. Then, the ASCII file is saved 590 and ready to be read by the main program for plotting.

Figure 18:
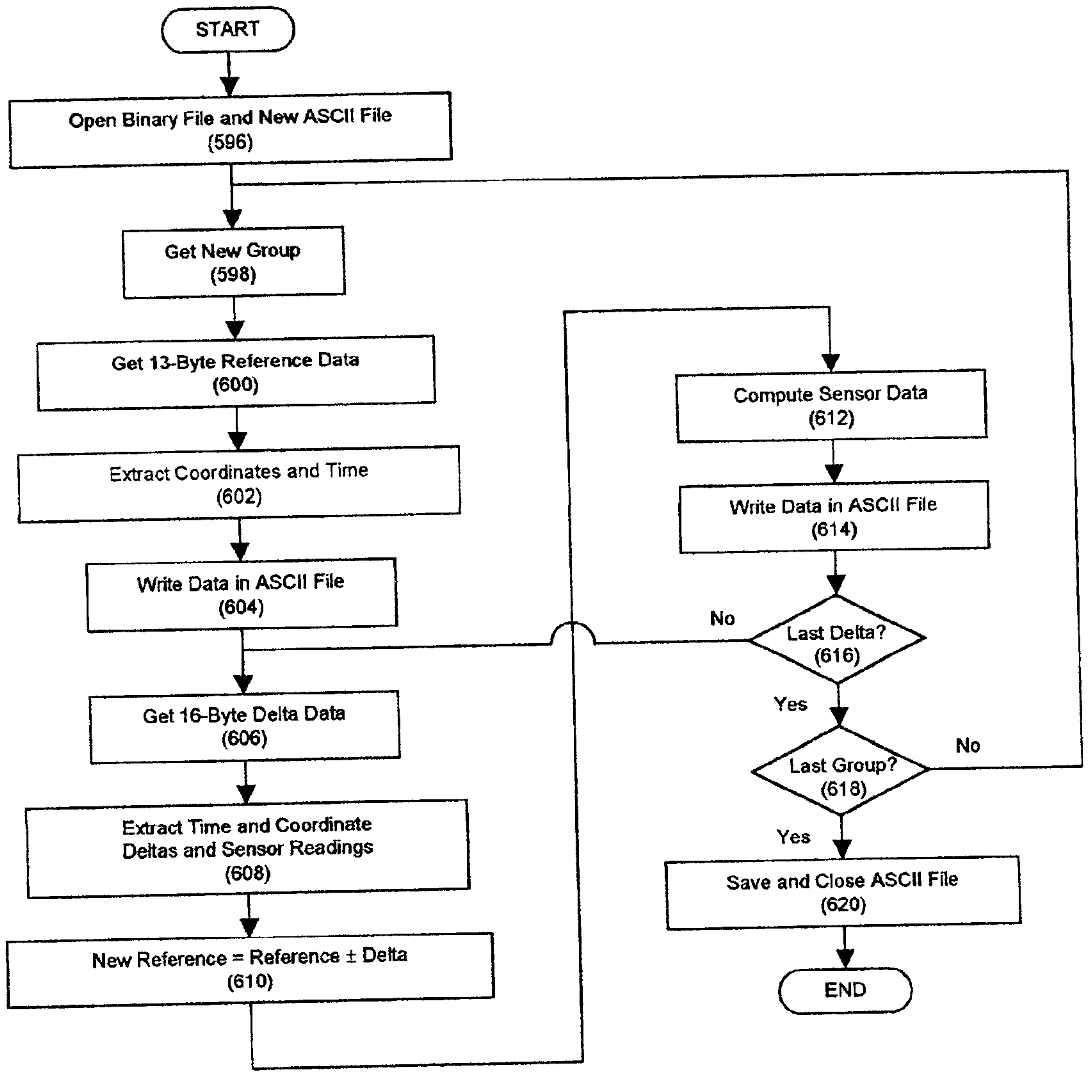
FIG. 18 is the flowchart of the data conversion and processing function on the host computer.

FIG. 18 is the flowchart of the data conversion and processing function on the host computer of the data retrieval unit. Data conversion and processing starts with opening a new ASCII data file and opening the binary data file that was generated after a data download 596. The first data group is retrieved from the binary file 598. A group consists of a reference, which contains the complete latitude, longitude and time, and deltas (differences between previous and present coordinates), which include the succeeding increments or decrements to the reference coordinates and time, as well as sensor data readings. Upon fetching the first group, the reference data are first obtained 600, and the latitude, longitude and time data are put in program variables 602. The program writes the data first in the ASCII file 604. Next, the coordinate deltas are fetched 606. The program extracts the sensor readings and places the data into variables 608. Then, the coordinate and time deltas are added or subtracted from the reference data, resulting in a new reference point 610. The program then calculates for the sensor data based on the raw sensor readings 612. The results are placed next in the ASCII file 614 until the last delta 616 in the last group 618 is processed. Finally, the ASCII file is saved and dosed 620. This file is now ready to be read from the main program for plotting.

Figure 19:
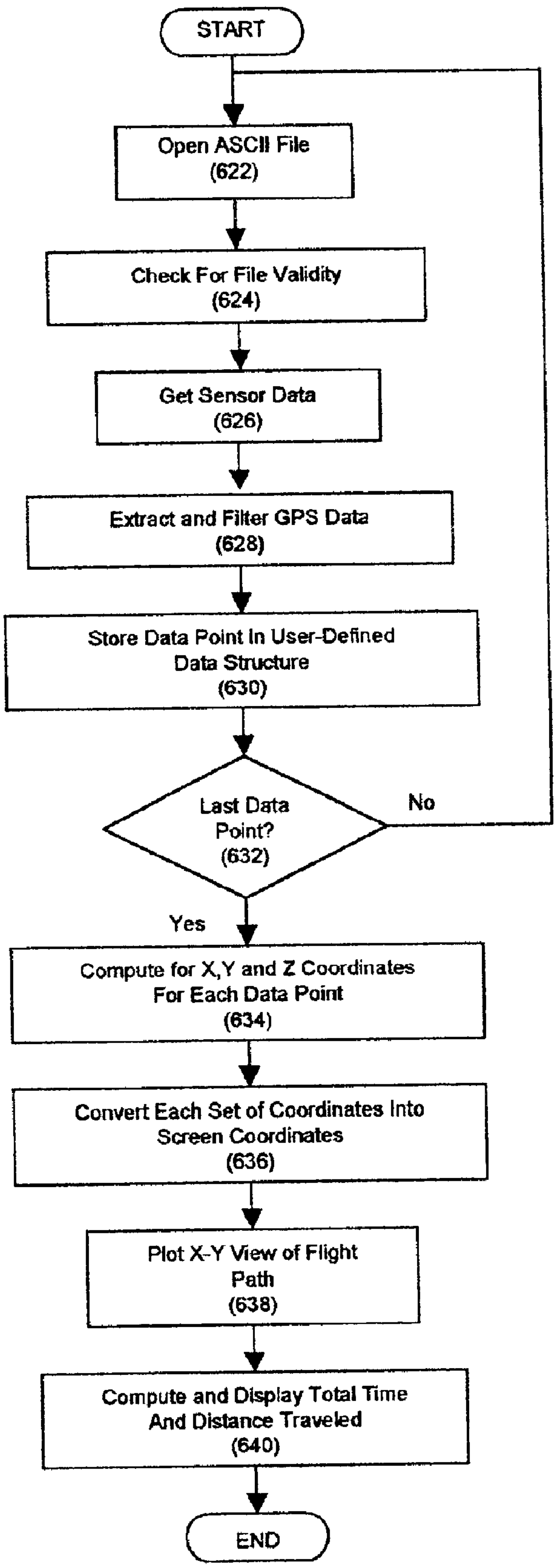
FIG. 19 is the flowchart of the graphic display function on the host computer.

FIG. 19 is the flowchart of the graphic display function on the host computer of the data retrieval unit. To display flight data on the computer screen, the program opens an ASCII data file whose filename is specified by the user 622. The file is checked if it is a valid data file 624. If the file is a valid file, sensor data are extracted 626 along with the GPS data, consisting of coordinates and time 628. Once retrieved, the GPS data is put in a user-defined data structure in the program 630. The process of obtaining GPS data is repeated until the last set of data is put in the data structures 632. Next, the program calculates for the x, y and z points for each GPS data record 634. These points are converted into screen coordinates 636. The x-y plot 638 of the file is displayed on the screen, while the x-z and y-z plots can be viewed once the user chooses the x-z and y-z plots on the View menu option. The total time and nautical miles of travel are displayed in the bottom of the resulting plot 640.

Figure 20:
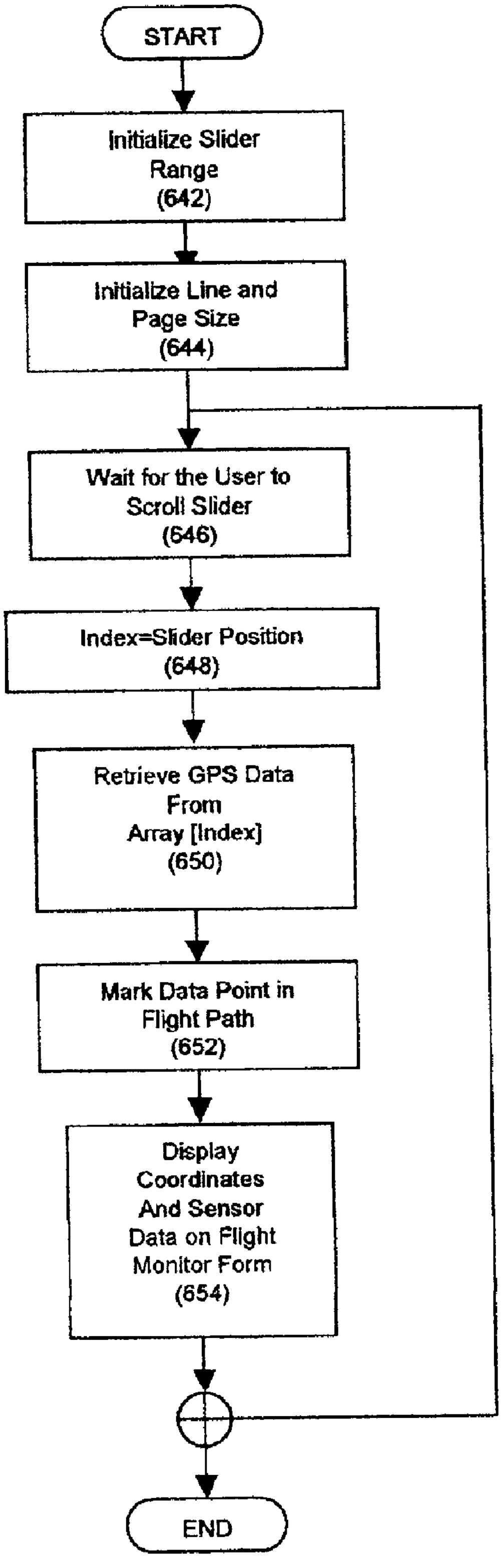
FIG. 20 is the flowchart of the flight monitor function on the host computer.

FIG. 20 is the flowchart of the flight monitor function on the host computer of the data retrieval unit. The flight monitor displays the coordinates, climb angle, descent angle, distance traveled, average ground speed and all the sensor data on any point on the flight plot. The point is selected by moving a slider on the screen which causes a cursor to move along the flight plot. For displaying the flight monitor, the slider object used by the program is first initialized based on the number of GPS data points that the program needs to plot 642. Then, the line and page size are scaled 644. The program now waits for the user to scroll the slider object 646 and the value of the slider position is assigned to the index variable 648. The corresponding GPS data in the array of user-defined data structures are retrieved using this index 650. Next, the program marks the data point in the flight plot 652, and the coordinates, computed data and sensor data are placed on the textboxes in the flight monitor screen 654. The program waits for the user to scroll the slider to display a new set of coordinates until the flight monitor is closed.

Although the invention has been shown and described with respect to the best mode embodiment thereof, it should be understood by those skilled in the art that the foregoing and various other changes, omissions and deletions in the form and detail thereof may be made therein without departing from the spirit and scope of this invention.

Conclusion, Ramifications and Scope

With this invention it is possible for small aircraft to be equipped with an inexpensive flight data recorder that is self-contained and easy to install. In the past, there have been numerous accidents involving small aircraft and in the absence of a flight data recorder, it has been very difficult and in some cases, impossible to determine the cause of the accident. Furthermore, due to the ease in the retrieval of data, it can be used also for training purposes, whereby the student and instructor can review his performance immediately after a flight. It can also be used in preventive maintenance since the mechanic can review the behavior of the aircraft and the stresses the aircraft is subjected to. Another application is asset monitoring, whereby the owner can monitor the usage and flights of his aircraft any time.

While the above description contains many specificities, these should not be construed as limitations on the scope of the invention, but rather an exemplification of one preferred embodiment thereof. Many other variations are possible For example, a sensor for measuring distance to ground such as an ultrasonic transducer can be added to provide more precise altitude readings during the final stages of landing. Position sensors for the engine and flight controls can also be added. A video camera can also be mounted inside the cockpit area and with the aid of digital video compression, the most recent images of a flight can be recorded in memory. For the wireless data transceiver, Bluetooth technology, the emerging standard for short range communications, can also be used. Instead of radio frequency, infrared techniques such as the one described by the IrDA standard can also serve as the wireless medium. As far as the host computer is concerned, a hand-held personal digital assistant, such as a Palm Pilot with the appropriate application software, can also be used.

Accordingly, the scope of the invention should be determined not by the embodiment illustrated, but by the appended claims and their legal equivalents.

What is claimed is:

1. A method of recording aircraft position data comprising:

providing an onboard flight data recorder unit and a ground-based data retrieving station, wherein said onboard flight data recorder unit is comprised of a single physical enclosure containing a central processing unit, a plurality of sensors for monitoring an aircraft's condition, a global position system (GPS) receiver, a non-volatile memory for recording flight data and a wireless communications transceiver for retrieving said data, said flight data recorder mounted on an aircraft floor or wall;

providing a GPS communications antenna;

connecting the recorder to the aircraft power supply and ignition switch; and computing the difference between current and previous coordinates generated by the GPS receiver and then storing the difference instead of the coordinates thereby saving memory space.

2. The method of claim 1 wherein recorded position data is converted to absolute coordinates by the ground-based data retrieving station by adding a first recorded difference to the initial coordinates resulting in a first absolute coordinate and then adding to it a next recorded difference to produce a second absolute coordinate and so on, wherein said initial coordinates are recorded at the start of every flight.

3. The method of claim 1 wherein periodically recording aircraft position and flight data at certain time intervals is set before the start of every flight by transmitting a desired interval to the flight data recorder.

4. The method of claim 3 wherein a recording time interval can be automatically varied in flight depending on aircraft speed by:

computing a speed of the aircraft by estimating a distance traveled between two points and dividing by a time traveled;

comparing said speed with pre-set values to determine if the aircraft is taxiing, cruising or taking off or landing; and setting the time interval to a highest value if the speed is equivalent to taxiing, intermediate value if cruising and a lowest value if taking off or landing.

* * * * *